United States Patent [19]

Nosaki et al.

[11] Patent Number: 6,064,489
[45] Date of Patent: May 16, 2000

[54] IMAGE FORMING APPARATUS

[75] Inventors: Takefumi Nosaki, Odawara; Masahiko Taniguchi; Toshiharu Takahashi, both of Kawasaki; Hironobu Machida; Kenji Takano, both of Tokyo, all of Japan

[73] Assignee: Kabushiki Kaisha Toshiba, Kawasaki, Japan

[21] Appl. No.: 09/009,544

[22] Filed: Jan. 20, 1998

[30] Foreign Application Priority Data

Jan. 20, 1997 [JP] Japan .................................... 9-007877

[51] Int. Cl.[7] ...................................................... G06F 15/00
[52] U.S. Cl. ............................ 358/1.13; 358/1.6; 358/401; 358/442
[58] Field of Search .......................... 358/1.6, 1.1, 1.13, 358/1.15, 1.16, 1.17, 401, 404, 440, 468, 442, 407, 443, 444, 523, 524, 1.14; 399/83

[56] References Cited

U.S. PATENT DOCUMENTS 5,600,445  2/1997  Omi ........................................ 358/296
5,701,184  12/1997  Motoyama ............................. 358/450
5,710,873  1/1998  Romano et al. ....................... 358/1.16
5,724,555  3/1998  Wadsworth ............................ 358/468
5,838,456  11/1998  Wagi et al. ............................ 358/300

FOREIGN PATENT DOCUMENTS 0 705 023   4/1996   European Pat. Off. .
44 10 077  12/1994   Germany .

OTHER PUBLICATIONS

Patent Abstracts of Japan, vol. 014, No. 079 (E–0888), JP 01–292993 (Feb. 14, 1990).

Primary Examiner—Dov Popovici
Assistant Examiner—Mark Wallerson
Attorney, Agent, or Firm—Foley & Lardner

[57] ABSTRACT

An apparatus relates to the switching of the flow of image data so as to optimize the data flow in accordance with the connection state of the respective optional boards of a PM unit, a FAX unit, a PRT unit, and an HDD unit. The flow of image data can be switched to optimize the data flow depending on the connection state of various optional boards.

4 Claims, 28 Drawing Sheets

(a) SCANNER/PRINTER: STRAIGHT ROUTE (MECHANICAL SORTING)
(b) ELECTRONIC SORTING/COPYING USING PM (PAGE MEMORY)
(c) LARGE-CAPACITY ELECTRONIC SORTING/COPYING USING HDD (a) SCANNER/PRINTER: STRAIGHT ROUTE (MECHANICAL SORTING)
(b) ELECTRONIC SORTING/COPYING USING PM (PAGE MEMORY)
(c) LARGE-CAPACITY ELECTRONIC SORTING/COPYING USING HDD (a) FAX TRANSMISSION VIA COMPRESSION BY FAX UNIT
(b) FAX TRANSMISSION VIA COMPRESSION BY PM UNIT
(c) FAX TRANSMISSION VIA STORAGE IN HDD UNIT (a) FAX RECEPTION/PRINTING VIA EXPANSION BY FAX UNIT
(b) FAX RECEPTION/PRINTING VIA EXPANSION BY PM UNIT
(c) FAX RECEPTION/PRINTING VIA STORAGE IN HDD UNIT (a) PRINTER PRINTING VIA EXPANSION BY PRINTER UNIT
(b) PRINTER PRINTING VIA EXPANSION BY PM UNIT
(c) PRINTER PRINTING VIA STORAGE IN HDD UNIT (a) FAX RECEPTION
(b) (c) CHECK RECEPTION CODE AND CONVERT CODE
(d) (e) READ FILE AND EXPAND IMAGE
(f) (g) ROTATE IMAGE
(h) PRINTING

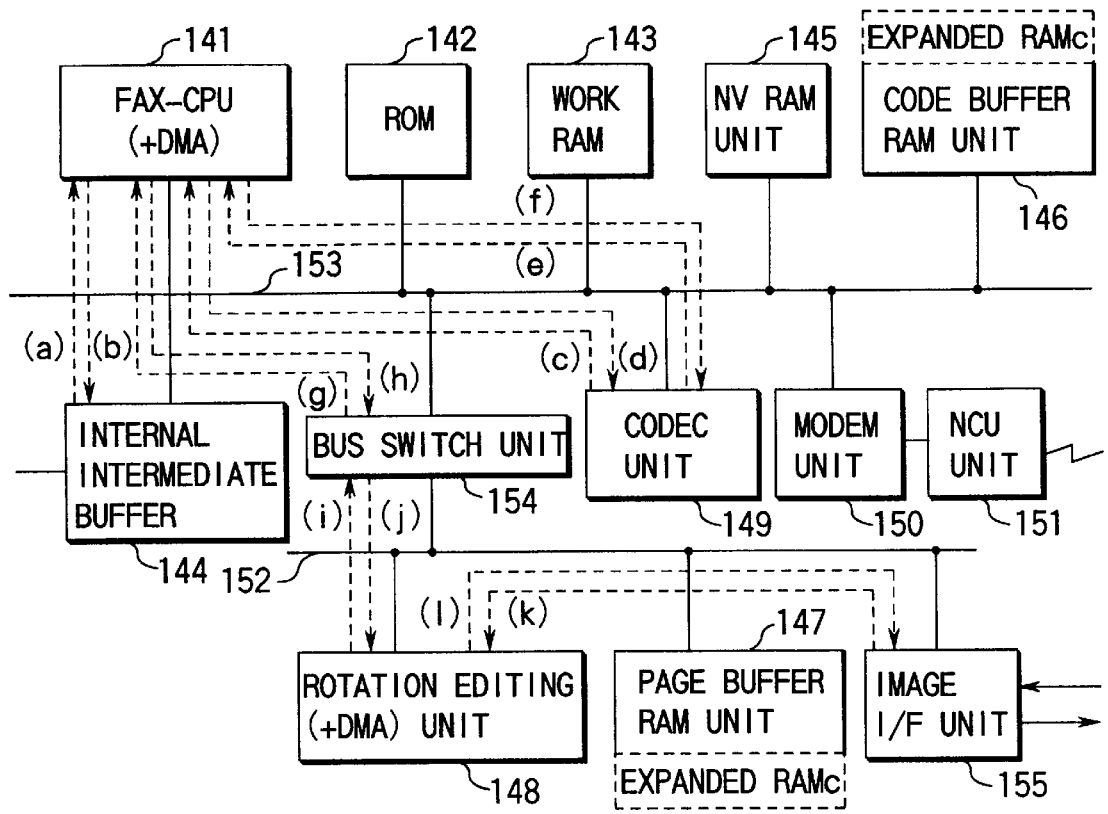

(a) DREQ1: DMA REQUEST SIGNAL FROM SYSTEM I/F UNIT TO FAX-CPU
(b) DACK1: DMA GRANT SIGNAL FROM FAX-CPU
(c) DREQ2: DMA REQUEST SIGNAL ch1 FROM CODEC UNIT TO FAX-CPU
(d) DACK2: DMA GRANT SIGNAL ch1 FROM FAX-CPU
(e) DREQ3: DMA REQUEST SIGNAL ch2 FROM CODEC UNIT TO FAX-CPU
(f) DACK3: DMA GRANT SIGNAL ch2 FROM FAX-CPU
(g) BREQ1bf: BUS ACCESS REQUEST SIGNAL FROM BUS SWITCH
  UNIT TO FAX-CPU
  (★1: REFLECT REQUEST FROM ROTATION EDITING UNIT)
  (★2: DOES NOT REFLECT REQUEST WHEN BUS IS DISCONNECTED BY
  BUS SWITCH UNIT)
(h) BGNT1bf: BUS ACCESS GRANT SIGNAL FROM FAX-CPU
(i) BREQ1: BUS ACCESS REQUEST SIGNAL FROM ROTATION
  EDITING UNIT TO FAX-CPU
  (REFLECT DMA REQUESTS FROM ROTATION EDITING UNIT AND
  IMAGE I/F UNIT)
(j) BGNT1: BUS ACCESS GRANT SIGNAL FROM BUS SWITCH UNIT
  (★3: REFLECT GRANT SIGNAL FROM FAX-CPU)
  (★4: TURN SIGNAL BACK BREQ1 WHEN BUS IS DISCONNECTED BY
  BUS SWITCH UNIT)
(k) DREQL1: DMA REQUEST SIGNAL FROM IMAGE I/F UNIT TO
  ROTATION EDITING UNIT
(l) DACKL1: DMA GRANT SIGNAL FROM ROTATION EDITING UNIT

FIG. 14

| OPTION LEVEL | PM UNIT | EXPANDED MEMORY | FAX UNIT | EXPANDED MEMORY | HDD UNIT | IMAGE INPUT/OUTPUT LEVEL |
|---|---|---|---|---|---|---|
| A | X | X | O | X | X | IMAGE IS INPUT/OUTPUT AND FILE IS STORED IN FAX UNIT |
| B | X | X | O | O | X | IMAGE IS INPUT/OUTPUT (COMPATIBLE WITH HIGH RESOLUTION) AND FILE IS STORED IN FAX UNIT |
| C | O | X | O | O/X | X | IMAGE IS INPUT/OUTPUT VIA PM UNIT (AT HIGH SPEED) (EDITING/TRANSMISSION/RECEPTION IS POSSIBLE), ORDER CHANGE ENABLED |
| D | O | O | O | O/X | X | FILE IS STORED IN PM UNIT (COMPATIBLE WITH HIGH RESOLUTION WITHOUT FAX BOARD AND EXPANDED MEMORY), ORDER CHANGE ENABLED |
| E | O | O/X | O | O/X | O | DOCUMENT IS STORED IN HDD UNIT (LARGE-AMOUNT STORAGE/TRANSMISSION/RECEPTION IS POSSIBLE), AND TIME-DESIGNATED TRANSMISSION/RECEPTION AND CONFIDENTIAL TRANSMISSION/RECEPTION ARE POSSIBLE, ORDER CHANGE ENABLED, PARALLEL OPERATION ENABLED |

FIG. 26

| DETERMINATION CRITERION | CONTENTS | OPERATION UPON DETERMINATION | NEXT STEP |
|---|---|---|---|
| A | PM UNIT OPTION MOUNTED? | N=(INDEPENDENT OPERATION BY OPTION) | end |
| | | Y=(IMAGE IS INPUT/OUTPUT VIA PM UNIT) | B |
| B | HDD UNIT ADDED? (STORAGE TYPE?) | Y=(STORAGE OPERATION BY HDD UNIT IS POSSIBLE IN HDD UNIT) | D |
| | | N= | C |
| C | EXPANDED MEMORY MOUNTED ON PM UNIT? | N=(FILE IS STORED IN OPTION) | D |
| | | Y=(FILE IS STORED IN PM UNIT) | D |
| D | PM UNIT ACCESSED BY ELECTRONIC SORTING OR ANOTHER OPTION? | Y=(SUSPENSION PROCESSING) | E |
| | | N=(PM UNIT IS ACQUIRED) | end |
| E | EXPANDED MEMORY OF PM UNIT FULL | Y=(PRIORITY ACCESS IS REQUESTED) | end |
| | | N=(OPERATION IS CONTINUED WITHOUT ANY CHANGE) | end |

FIG. 27

PM CHANNEL USED BY EACH OPERATION

| OPERATION | RECTANGULAR ADDRESS | FIFO | CODEC | TIME |
|---|---|---|---|---|
| ELECTRONIC SORTING/INPUT | 2 | 1 | 1 | 1 |
| ELECTRONIC SORTING/OUTPUT | 2 | 1 | 1 | 1 |
| FAX INPUT/COMPRESSION | 2 | 1 | 1 | 0.5(HIGH)/0.25(NORMAL) |
| FAX EXPANSION/PRINTING | 2 | 1 | 1 | 0.5(HIGH)/0.25(NORMAL) |
| PRINTING EXPANSION/PRINTING | 2 | 1 | 1 | 1 |
| FAX ROTATION EDITING/CONVERSION | 2 | 1 | 1 | $(0.5/0.25)^2$ |

FIG. 28

IMAGE FORMING APPARATUS

BACKGROUND OF THE INVENTION

The present invention relates to an image forming apparatus such as a digital copying machine having extended functions such as memory copying, a facsimile, and a printer, in addition to normal copying.

Conventionally, an image forming apparatus such as a digital copying machine has extended functions such as memory copying, a facsimile, and a printer, other than normal copying.

In extending the function in this manner, a page memory board serving as an image page memory, a facsimile board capable of facsimile-transmission/reception, a printer board serving as a printer interface for receiving printing data from a personal computer, and an HDD board capable of magnetically storing a large amount of data are mounted as optional boards, as needed. In this manner, the function can be extended.

In this image forming apparatus, however, the flow of image data remains unchanged upon connecting various optional boards, and the data flow is often not optimal.

BRIEF SUMMARY OF THE INVENTION

It is an object of the present invention to provide an image forming apparatus in which the flow of image data can be switched in accordance with the connection state of various optional boards so as to optimize the data flow.

To achieve the above object, the present invention provides an image forming apparatus having read means for reading an image, and image forming means for forming an image of image data read by the read means on an image formation medium, comprising: a first processing board which is mounted on the image forming apparatus, has a page memory, and has a first function of forming an image of image data from an external device on the image formation medium by using the image forming means, and outputting the image data read by the read means to the external device; and a second processing board which is mounted on the image forming apparatus, and has a second function of storing the image data read by the read means and storing image data in executing the first function, wherein a flow of the image data is switched between a case in which only the first processing board is mounted on the image forming apparatus, and a case in which both the first and second processing boards are mounted on the image forming apparatus, and when both the first and second processing boards are mounted on the image forming apparatus, part of the first function of the first processing board is switched to be processed by the second processing board.

The present invention also provides an image forming apparatus having read means for reading an image, and image forming means for forming an image of image data read by the read means on an image information medium, comprising: a first processing board which is mounted on the image forming apparatus, has a first page memory, and has a first function of forming an image of image data from a first external device on the image formation medium by using the image forming means, and outputting the image data read by the read means to the first external device; a second processing board which is mounted on the image forming apparatus, has a second page memory, and has a second function of forming the image of the image data from a second external device on the image formation medium by using the image forming means; and a third processing board which is mounted on the image forming apparatus, and has a third function of storing the image data read by the read means, storing image data in executing the first function, and storing image data in executing the second function, wherein, when at least the third processing board and the first or second processing board are mounted on the image forming apparatus, the first or second function of the first or second processing board is executed using the third function of the third processing board without using the first or second page memory of the first or second processing board, and in executing the first or second function, whether the first or second function is used by another function is determined, degrees of urgency are compared, when the first or second function is determined to have high urgency, the function in use having low urgency is temporarily interrupted, after the function having high urgency is performed, operation of the function having low urgency is continued again.

The present invention further provides an image forming apparatus having read means for reading an image, and image forming means for forming an image of image data read by the read means on an image formation medium, comprising: a first processing board which is mounted on the image forming apparatus, has a first page memory, and has a first function of forming an image of image data from a first external device on the image formation medium by using the image forming means, and outputting the image data read by the read means to the first external device; a second processing board which is mounted on the image forming apparatus, has a second page memory, and has a second function of forming the image of the image data from a second external device on the image formation medium by using the image forming means; a third processing board which is mounted on the image forming apparatus, and has a third function of storing the image data read by the read means, storing image data in executing the first function, and storing image data in executing the second function; and a fourth processing board which is mounted on the image forming apparatus, has a storage capacity larger than a storage capacity of the third processing board, and has a fourth function of storing the image data read by the read means, wherein, when at least one of the processing boards is mounted on the image forming apparatus, a flow of the image data is switched to be optimized.

The present invention further provides an image forming apparatus having read means for reading an image, and image forming means for forming an image of image data read by the read means on an image formation medium, comprising: a first processing board which is mounted on the image forming apparatus, has a page memory, and has a first function of forming an image of image data from an external device on the image formation medium by using the image forming means, and outputting the image data read by the read means to the external device; and a second processing board which is mounted on the image forming apparatus, and has a second function of storing the image data read by the read means and storing image data in executing the first function, wherein a flow of the image data is switched between a case in which only the first processing board is mounted on the image forming apparatus, and a case in which both the first and second processing boards are mounted on the image forming apparatus, and when both the first and second processing boards are mounted on the image forming apparatus, part of the first function of the first processing board is switched to be processed by the second processing board, and part of the first function of the first processing board is replaced with another function.

Additional object and advantages of the invention will be set forth in the description which follows, and in part will be obvious from the description, or may be learned by practice of the invention. The object and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 10 to 14 are block diagrams, respectively, showing the internal arrangement of a FAX unit;

FIG. 26 is a table for explaining an example when the functions of the respective system configurations are compared;

FIG. 27 is a table for explaining processing when various options are mounted; and FIG. 28 is a table for explaining the number of resource channels used and the processing time in each processing of the PM unit.

DETAILED DESCRIPTION OF THE INVENTION

An embodiment of the present invention will be described below with reference to the several views of the accompanying drawing.

More specifically, the following description is directed to an embodiment in which the present invention is applied to a multi-functional image forming apparatus having three, copying machine, facsimile, and printer functions.

Figure 1:
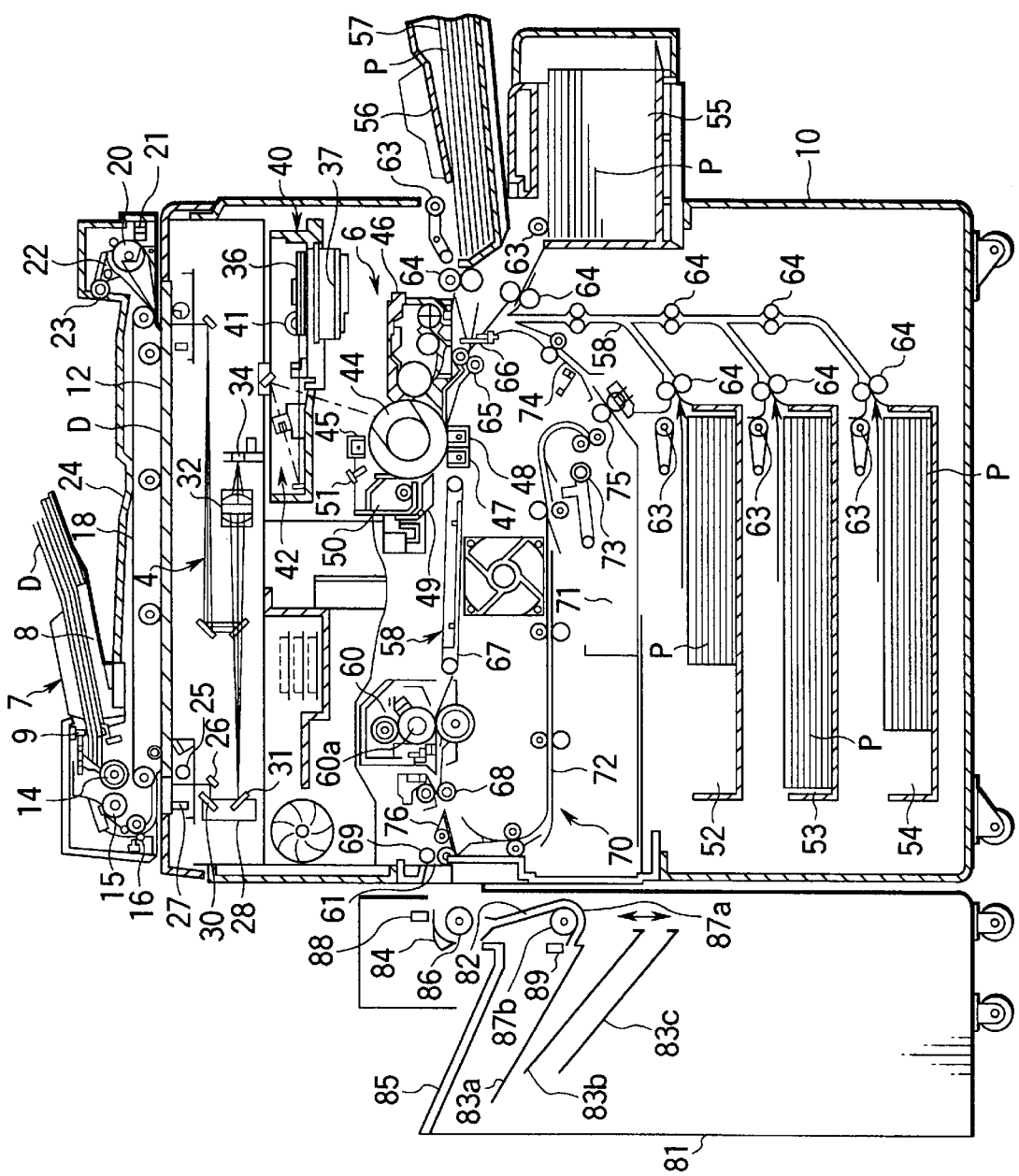
FIG. 1 is a sectional view showing the internal structure of a digital copying machine as an example of an image forming apparatus in order to explain an embodiment of the present invention.

FIG. 1 is a sectional view showing the internal structure of a digital copying machine as an example of the image forming apparatus of the present invention.

As shown in FIG. 1, the digital copying machine comprises a machine main body 10. The machine main body 10 incorporates a scanner unit 4 functioning as a read means (to be described later), and a printer unit 6 functioning as an image forming means.

A transparent glass original table 12 on which a read target, i.e., an original D is placed is arranged on the upper surface of the machine main body 10. An automatic document feeder 7 (to be referred to as an ADF hereinafter) for automatically feeding the original onto the original table 12 is disposed on the upper surface of the machine main body 10. The ADF 7 can be opened/closed with respect to the original table 12, and also functions as an original press for tightly pressing the original D placed on the original table 12 against the original table 12.

The ADF 7 comprises an original tray 8 in which the original D is set, an empty sensor 9 for detecting the presence/absence of an original, a pickup roller 14 for picking up originals from the original tray 8 one by one, a paper feed roller 15 for conveying a picked original, an aligning roller pair 16 for aligning the leading end of the original, and a convey belt 18 looped to cover almost the whole original table 12. A plurality of originals set in the original tray 8 with information-bearing surfaces facing up are sequentially picked up from the lowest page, i.e., the last page. The original is aligned by the aligning roller pair 16, and then conveyed by the convey belt 18 to a predetermined position on the original table 12.

In the ADF 7, a reverse roller 20, a non-reverse sensor 21, a flapper 22, and a paper discharge roller 23 are disposed at an end portion opposite to the aligning roller pair 16 with respect to the convey belt 18. The original D from which image information is read by the scanner unit 4 (to be described later) is fed by the convey belt 18 from the original table 12 to be discharged onto an original discharge portion 24 on the upper surface of the ADF 7 via the reverse roller 20, the flapper 22, and the paper discharge roller 23. When the lower surface of the original D is to be read, the flapper 22 is switched. The original D conveyed by the convey belt 18 is reversed by the reverse roller 20, and then fed again by the convey belt 18 to a predetermined position on the original table 12.

The scanner unit 4 arranged in the machine main body 10 has an exposure lamp 25 serving as a light source for illuminating the original D placed on the original table 12, and a first mirror 26 for deflecting light reflected by the original D to a predetermined direction. The exposure lamp 25 and the first mirror 26 are attached to a first carriage 27 arranged below the original table 12.

The first carriage 27 is movable parallel to the original table 12, and is driven to reciprocate below the original table 12 by a driving motor via a toothed belt (neither are shown).

A second carriage 28 movable parallel to the original table 12 is disposed below the original table 12. Second and third mirrors 30 and 31 for sequentially deflecting light reflected by the original D that has been deflected by the first mirror 26 are attached to the second carriage 28 at right angles to each other. The second carriage 28 is driven following the first carriage 27 by the toothed belt for driving the first carriage 27. The second carriage 28 is moved parallel to the original table 12 at a speed ½ that of the first carriage.

An imaging lens 32 for focusing light reflected by the third mirror 31 on the second carriage 28, and a CCD sensor 34 for receiving and photoelectrically converting the reflected light focused by the imaging lens are disposed below the original table 12. The imaging lens 32 is movable via a driving mechanism within a plane including the optical axis of light deflected by the third mirror 31. The imaging lens 32 itself moves to image the reflected light at a desired magnification. The CCD sensor 34 photoelectrically converts the incident reflected light, and outputs an electrical signal corresponding to the read original D.

The printer unit 6 comprises a laser exposure device 40 operating as a latent image forming means. The laser exposure device 40 comprises a semiconductor laser 41 serving as a light source, a polygon mirror 36 serving as a scanning member for continuously deflecting a laser beam emitted by the semiconductor laser 41, a polygon motor 37 serving as a scanning motor for rotating the polygon mirror 36 at a predetermined rotational speed (to be described later), and an optical system 42 for deflecting the laser beam traveling from the polygon mirror to guide the laser beam to a photosensitive drum 44 (to be described below). The laser exposure device 40 having this arrangement is permanently supported by a support frame (not shown) of the machine main body 10.

The semiconductor laser 41 is ON/OFF-controlled in accordance with the image information of the original D read by the scanner unit 4, facsimile-transmitted/received document information, or the like. A laser beam emitted by the semiconductor laser 41 is directed to the photosensitive drum 44 via the polygon mirror 36 and the optical system 42 to scan the outer surface of the photosensitive drum 44, thereby forming an electrostatic latent image on the outer surface of the photosensitive drum 44.

The printer unit 6 has the freely rotatable photosensitive drum 44 as an image carrier disposed at the center inside the machine main body 10. The outer surface of the photosensitive drum 44 is exposed by a laser beam coming from the laser exposure device 40 to form a desired electrostatic latent image. A charger 45 for charging the outer surface of the drum with predetermined charges, a developing unit 46 for supplying toner serving as a developing agent to the electrostatic latent image formed on the outer surface of the photosensitive drum 44 to develop the image at a desired image density, a transfer charger 48 which integrally has a separation charger 47 for separating, from the photosensitive drum 44, a transfer medium, i.e., a copying paper sheet P supplied from a paper cassette (to be described later), and transfers the toner image formed on the photosensitive drum 44 to the paper sheet P, a separation claw 49 for separating the copying paper sheet P from the outer surface of the photosensitive drum 44, a cleaner 50 for cleaning any toner left on the outer surface of the photosensitive drum 44, and a change remover 51 for charge-removing the outer surface of the photosensitive drum 44 are sequentially arranged around the photosensitive drum 44.

An upper cassette 52, a middle cassette 53, and a lower cassette 54 each of which can be pulled out of the machine main body are stacked on each other at a lower portion in the machine main body 10. Copying paper sheets different in size are loaded in the respective cassettes. A large-capacity feeder 55 is arranged aside these cassettes. In the large-capacity feeder 55, about 300 copying paper sheets P having a frequently used size, e.g., A4 size are stored. A paper feed cassette 57 also serving as a manual feed cassette 56 is detachably mounted above the large-capacity feeder 55.

Inside the machine main body 10, a convey path 58 extending from each cassette and the large-capacity feeder 55 through a transfer portion located between the photosensitive drum 44 and the transfer charger 48 is formed. A fixing device 60 having a fixing lamp 60*a* is arranged at the terminal of the convey path 58. A discharge port 61 is formed in the side wall of the machine main body 10 facing the fixing device 60. A sorter 81 is attached into the discharge port 61.

A pickup roller 63 for picking up the paper sheets P from the cassette or the large-capacity feeder one by one is arranged near each of the upper cassette 52, the middle cassette 53, the lower cassette 54, the paper feed cassette 57, and the large-capacity feeder 55. Many paper feed roller pairs 64 for conveying, via the convey path 58, the copying paper sheet P picked up by the pickup roller 63 are arranged on the convey path 58.

On the convey path 58, a registration roller pair 65 is disposed on the upstream side of the photosensitive drum 44. The registration roller pair 65 corrects any skew of the picked copying paper sheet P. At the same time, the registration roller pair 65 aligns the leading end of a toner image on the photosensitive drum 44 and the leading end of the copying paper sheet P, and feeds the copying paper sheet P to the transfer portion at the same speed as the moving speed of the outer surface of the photosensitive drum 44. Before the registration roller pair 65, i.e., on the paper feed roller 64 side, a pre-aligning sensor 66 for detecting arrival of the copying paper sheet P is arranged.

The copying paper sheets P picked up by the pickup roller 63 from each cassette or the large-capacity feeder 55 one by one are sent by the paper feed roller pair 64 to the registration roller pair 65. After the registration roller pair 65 aligns the leading end of the copying paper sheet P, the copying paper sheet P is fed to the transfer portion.

At the transfer portion, a developing agent image, i.e., a toner image formed on the photosensitive drum 44 is transferred to the paper sheet P by the transfer charger 48. The copying paper sheet P having the toner image transferred thereon is separated from the outer surface of the photosensitive drum 44 by the operations of the separation charger 47 and the separation claw 49, and conveyed to the fixing device 60 via a convey belt 67 constituting part of the convey path 58. After the fixing device 60 melts and fixes the developing agent image on the copying paper sheet P, the copying paper sheet P is discharged onto a sorter 81 via the discharge port 61 by a paper feed roller pair 68 and a paper discharge roller pair 69.

An automatic both-side device 70 for reversing the copying paper sheet P having passed through the fixing device 60, and feeding the paper sheet P to the registration roller pair 65 again is arranged below the convey path 58. The automatic both-side device 70 comprises a temporary stack 71 for temporarily stacking copying paper sheets P, a reverse path 72 branching from the convey path 58 to reverse the copying paper sheet P having passed through the fixing device 60 and guide it to the temporary stack 71, a pickup roller 73 for picking up the copying paper sheets P stacked in the temporary stack one by one, and a paper feed roller pair 75 for feeding each picked paper sheet to the registration roller pair 65 via a convey path 74. A selector gate 76 for selectively sending the copying paper sheet P to the discharge port 61 or the reverse path 72 is arranged at the branch portion between the convey path 58 and the reverse path 72.

In both-side copying, the copying paper sheet P having passed through the fixing device 60 is guided to the reverse path 72 by the selector gate 76, and then temporarily stored in the temporary stack 71 while being reversed. The copying paper sheet P is sent to the registration roller pair 65 via the convey path 74 by the pickup roller 73 and the paper feed roller pair 75. After being aligned by the registration roller pair 65, the copying paper sheet P is sent to the transfer portion again. A toner image is transferred to the lower surface of the copying paper sheet P. Thereafter, the copying paper sheet P is discharged to the sorter 81 via the convey path 58, the fixing device 60, and the paper discharge roller pair 69.

The sorter 81 is constituted by a convey roller 86 for conveying the paper sheet P discharged from the discharge port 61 of the main body 10, a gate means 84 for selectively sending the paper sheet P conveyed by the convey roller 86 to different destinations in accordance with sorting or non-sorting, a convey path 82 for conveying the paper sheet P sent by the gate means 84 in sorting, a plurality of bins 83a which face the outlet of the convey path 82 and are vertically movable by a bin moving mechanism (not shown), and a paper discharge tray 85 to which the paper sheet P sent by the gate means 84 in non-sorting is discharged.

The convey path 82 is constituted by a convey guide 87a and a convey roller 87b.

A sensor 88 for detecting insertion of a paper sheet P from the discharge port 61 of the main body 10 to the sorter 81 is arranged near the convey roller 86. A sensor 89 for detecting conveyance of paper sheets P to the bins 83a is arranged near the convey roller 87b.

An operation panel 90 allowing input of various copying conditions and a copying start signal for starting copying is disposed on the upper portion of the front surface of the machine main body 10.

A control system for the digital copying machine will be described below with reference to FIGS. 2 to 5.

The control system for the digital copying machine is roughly classified into two parts.

The first part is a PPC engine unit made up of the ADF 7 for automatically feeding originals D to the original table 12 one by one, the scanner unit 4 for optically scanning each original D and converting it into an electrical image signal corresponding to its image, an image processing unit 100 for receiving the electrical image signal from the scanner unit 4 to perform adjustment of density characteristics, filtering, enlargement/reduction, gradation processing, and the like, the printer unit 6 for receiving an image signal from the image processing unit 100 to record an image on a copying paper sheet P, the sorter 81 for sorting the copying paper sheet P discharged from the printer unit 6, and an M (main)-CPU unit 101 for controlling the whole operation.

The second part is constituted by the operation panel 90 serving as an interface with the user, a bus bridge unit 102 for converting an interface function with the M-CPU unit 101 or a local bus into a system bus, a PM unit (image page memory: PM board) 103 capable of holding image data corresponding to at least one page, a FAX unit (FAX board) 104 having a function capable of FAX-transmitting/receiving data to/from an external device 111 via a public line 110, a printer interface unit (PRT unit: PRT board) 105 for receiving printing data from a personal computer (PC) 112, an HDD unit (HDD board) 106 capable of magnetically storing a large amount of data, an SM (SysteM)-CPU unit 107 for controlling all the units, a ROM 108 in which control programs used by the SM-CPU unit 107 are stored, and a RAM 109 for storing processing data.

The PM unit 103, the FAX unit 104, the PRT unit 105, and the HDD unit 106 are optional boards accessory to the fundamental arrangement of the copying machine.

Expanded memories 103a, 104a, and 105a are respectively arranged in the PM unit 103, the FAX unit 104, and the PRT unit 105.

The image processing unit 100 is connected to the PM unit 103, the FAX unit 104, and the PRT unit 105 via image buses 113. The bus bridge unit 102, the operation panel 90, the PM unit 103, the FAX unit 104, the PRT unit 105, and the HDD unit 106 are connected to each other via a system bus 114. The bus bridge unit 102, the SM-CPU unit 107, the ROM 108, and the RAM 109 are connected to each other via a local bus 115.

In the above arrangement, in response to an instruction from the user via the operation panel 90, the SM-CPU unit 107 of this machine instructs the M-CPU unit 101 to start operation such as copying. The M-CPU unit 101 controls the ADF 7, the scanner unit 4, the printer unit 6, and the sorter 81 to copy. At this time, the SM-CPU unit 107 sets processing parameters based on the processing scheme in the image processing unit 100. The image processing unit 100 performs image processing in accordance with sync signals from the scanner unit 4 and the printer unit 6.

This machine realizes an extended copying function such as a memory copying function, a FAX function, and a printer function, in addition to a fundamental copying function. However, since all the users do not require a machine with all the functions, the functions other than the fundamental function can be added in accordance with demands of different users. That is, blocks surrounded by broken lines in each of FIGS. 2 to 5 are options.

Each broken arrow indicates the flow of image data in accordance with the addition condition of options at that time.

Figure 2:
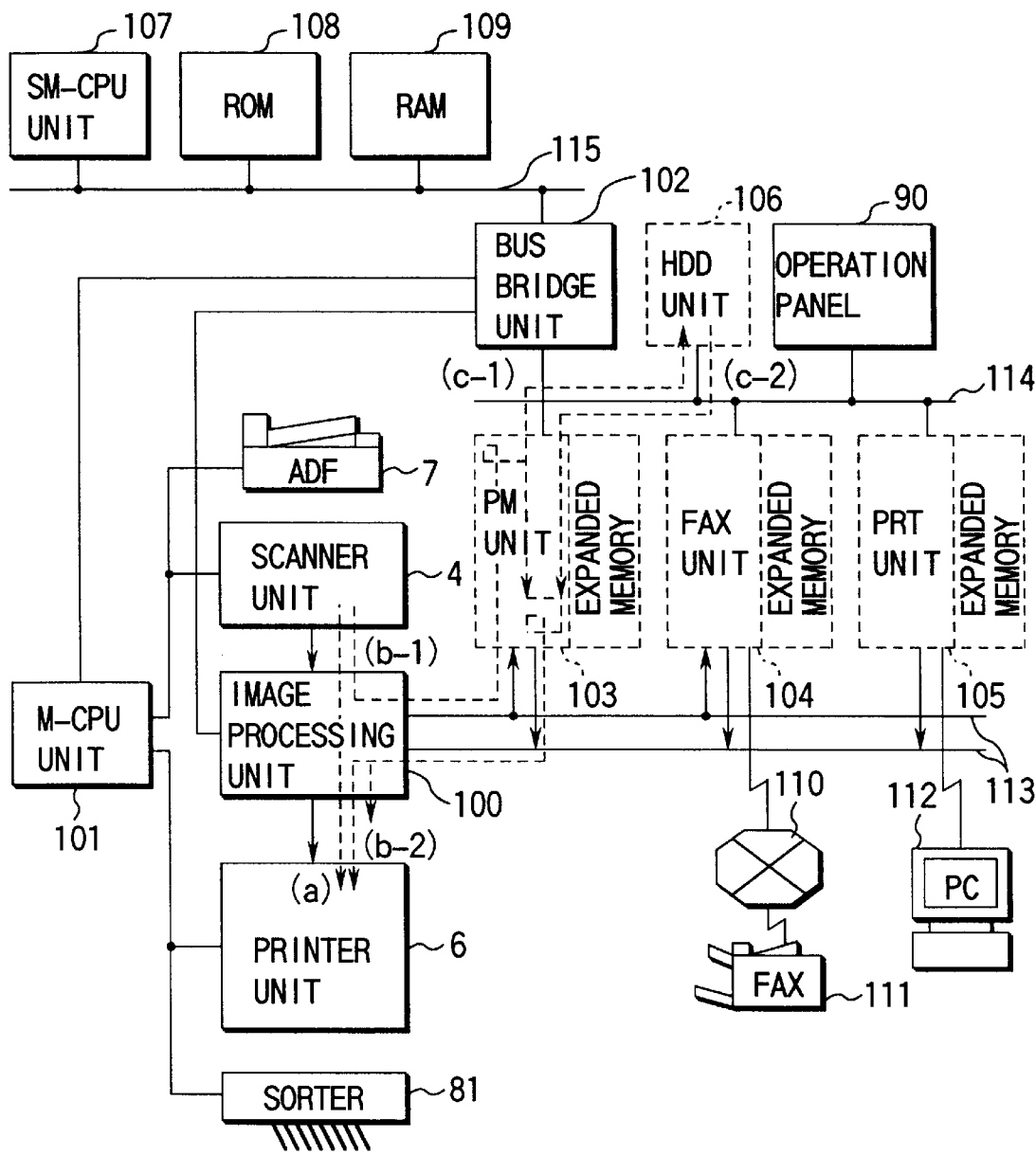
FIGS. 2 to 5 are block diagrams, respectively, showing the control system of the digital copying machine.

The flow of image data in the copying function will be explained with reference to FIG. 2.

(a) is the flow of image data in the fundamental arrangement. At this time, the image data flows through the scanner unit 4, the image processing unit 100, and the printer unit 6. (b) is the flow when the PM unit (image Page Memory) 103 is mounted as an option.

In the latter case, data from the image processing unit 100 is temporarily held by the PM unit 103 via an image bus in units of pages, and compressed and stored as a compressed file. After all originals placed on the original table are stored as compressed files, the files are read and expanded from the first read file. The expanded file is sent as image data to the printer unit 6, which forms an image on a paper sheet P. This operation is repeatedly performed up to the last page to obtain copies sorted in the same order as that of the originals. In addition, by performing this operation repeatedly by a designated number of times, the designated number of copy sets can be obtained.

In this way, a plurality of copy sets can be obtained though the scanner unit 4 reads image data only once. If the first copy set is actually stored as a compressed file, and data before compression is output to the printer unit 6, copy output can be prevented from delaying.

The above file copying operation leads to a reduction in noise and energy saving owing to a smaller number of read operations, time saving because the user can quickly remove read originals, and the like.

Image data flows through the same route in image synthesis in which a plurality of images are overlayed on each other, reduction synthesis editing in which a plurality of page images are reduced to be contained on one page, and the like.

(c-1, c-2) are data flows when the file described in (b) is stored in not the PM unit 103 but the HDD unit 106 in order to increase the capacity. Since the file is stored in the HDD unit 106 at the sane time as the PM unit 103, the speed does not decrease.

Figure 3:
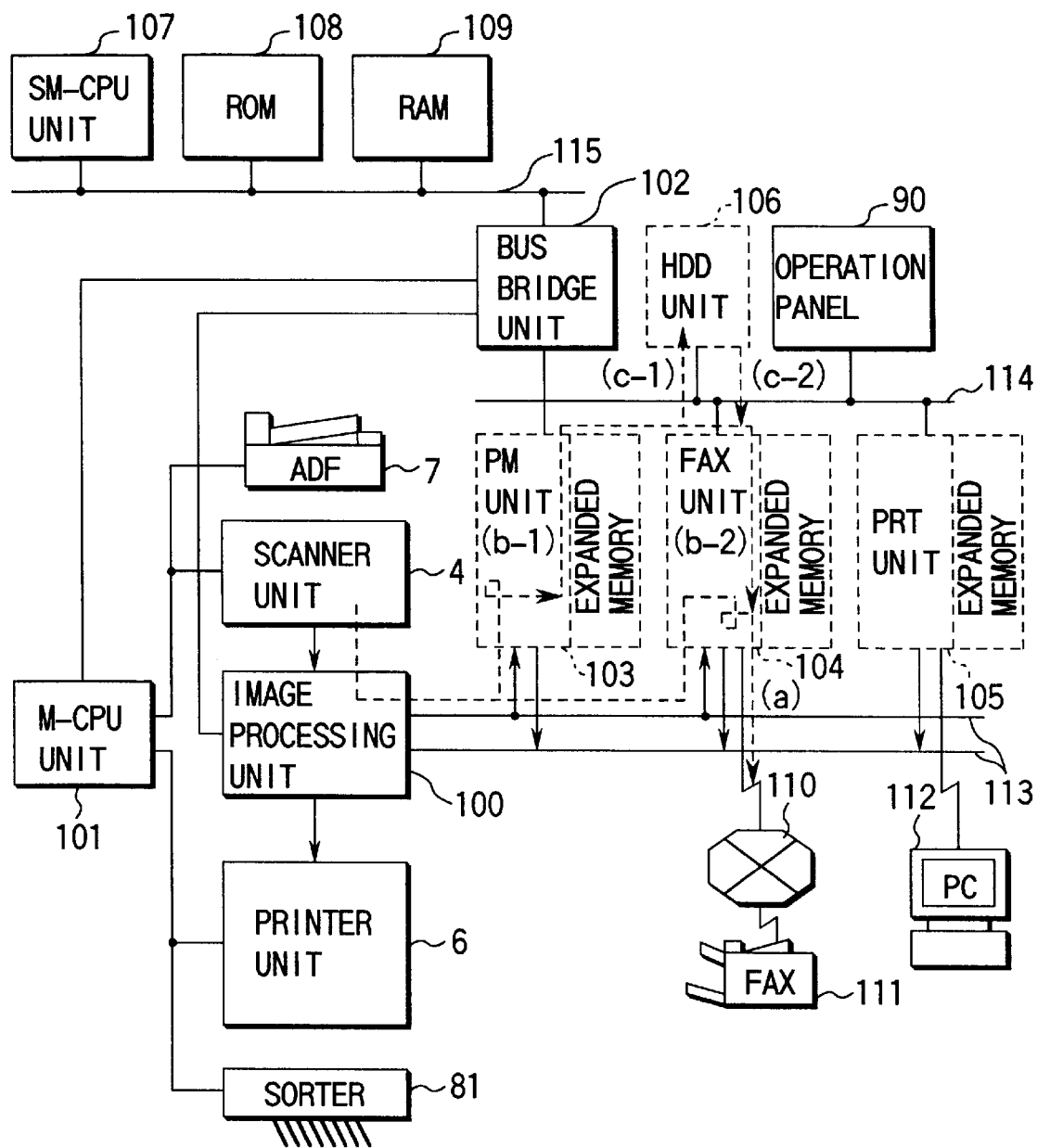

FIG. 3 shows the flow of image data in FAX transmission.

(a) is the flow of image data when only the FAX unit 104 is added to the fundamental arrangement. Image data read by the scanner unit 4 and processed by the image processing unit 100 flows through an image bus to be received by the FAX unit 104. If necessary, the image is rotated because the image input direction for the copying machine is different from that for the FAX device. The image data is compressed in accordance with the ITU standard recommendation, and stored as a transmission file in the FAX unit 104. The FAX unit 104 transmits the transmission image data to a designated receiving FAX via a public line in the form of compressed data with the transmission time and source information.

(b-1, b-2) are the flows of image data when the PM unit 103 is further added as an option to the arrangement in (a). When the PM unit 103 is added, image rotation or compression can be performed at a higher speed than in the case of adding only the FAX unit 104. For this reason, the image input operation can be performed at a higher speed for a plurality of originals, and reduction editing synthesis and the like can be performed. On the route at this time, image data from the image processing unit 100 is received by the PM unit 103, subjected to rotation/editing, as needed. The image data is compressed into a file, and then sent as a transmission file to the FAX unit 104. As far as the capacity of the page memory permits, the image data are transmitted in the input order when originals are manually input, or transmitted from the last page as one page when they are fed by the ADF 7. This is because the normal original input order of the copying machine is different from the original input order of the FAX device. This processing is not performed when the FAX unit 104 alone is added. Similar to the case of (a), the FAX unit 104 adds the transmission time and source information to the transmission file, and transmits the file to a receiving FAX via a public line.

(c-1, c-2) are data flows when the file storage destination can be changed from the PM unit 103 and the FAX unit 104 to the HDD unit 106 to increase the file storage capacity, similar to the case of the copying function. With this setting, e.g., the number of transmission documents and the number of receiving end systems by time-designated FAX transmission can be increased. On the route in this case, image data output from the image processing unit 100 is temporarily received by the PM unit 103, subjected to rotation/editing, compressed into a file, and then temporarily stored in the HDD unit 106. After all originals stacked on the ADF are read by the scanner unit 4 and stored in the HDD unit 106, the image data is sent as transmission data to the FAX unit 104. The FAX unit 104 transmits the transmission file.

Figure 4:
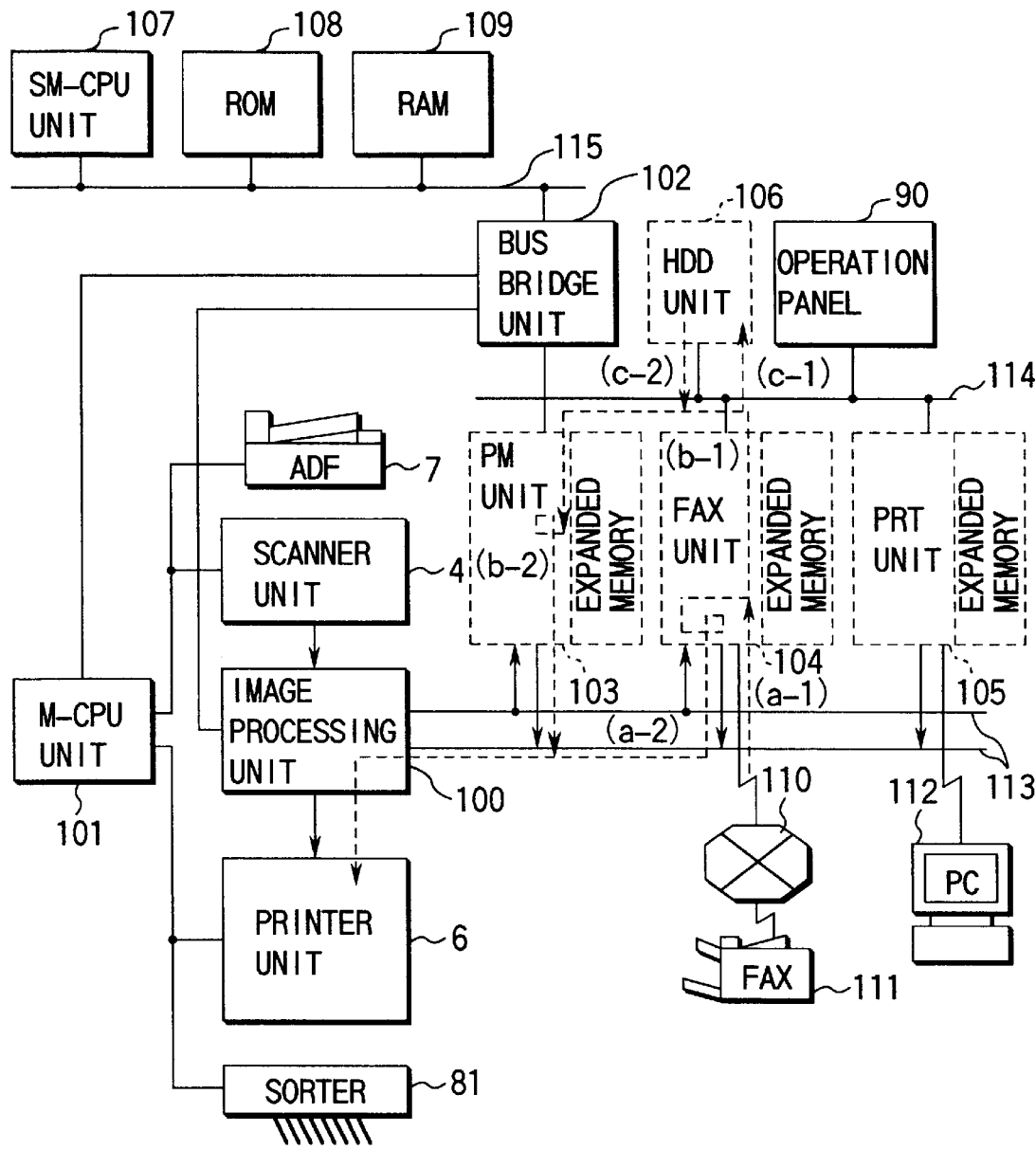

FIG. 4 shows the flow of image data in FAX reception. When only the FAX unit 104 is connected to the fundamental arrangement indicated by solid lines, data flows as indicated by broken lines (a-1, a-2). That is, received FAX data is subjected to a compression code data check by the FAX unit 104, and then expanded to printing data. To print the printing data in accordance with copying paper sheets P present at the printer unit 6, the printing data is rotated, as needed, and output to an output image bus. The data is subjected to smoothing as output image processing and printed, and copies are discharged by the printer unit 6.

When the PM unit 103 is further added to the arrangement of the fundamental arrangement+the FAX unit 104, the route changes to (b-1, b-2). In this arrangement, since the processing speed in units of pages increases, the time in simultaneously printing received documents can be shortened. FAX data received by the FAX unit 104 is subjected to a compression code data check by the FAX unit 104, then sent to the PM unit 103, and stored in units of pages. At this time, to allow the difference between the transmission data order of the FAX device and the normal printing order of the copying machine that has been described in the case of transmission, all pages by one communication are stored in the PM unit 103, and expanded and printed from the last page by the PM unit 103 so long as the capacity of the page memory permits. This processing is not performed when only the FAX unit 104 is added.

When the HDD unit 106 is further added to the arrangement of the fundamental arrangement+the FAX unit 104+the PM unit 103, the route changes to (c-1, c-2). In this arrangement, the reception capacity greatly increases. Therefore, even if the apparatus operates as a copying machine or a FAX device, and is processing a job other than the communication currently being received, the communication is not disabled because of a sufficient reception capacity. Alternatively, the reception capacity of communication with a designated end system such as confidential communication in which a reception file cannot be erased unless the user at the receiver inputs a password and prints can be increased.

On the route at this time, data received by the FAX unit 104 is subjected to a compression code data check by the FAX unit 104, and then stored in the HDD unit 106. When printing is designated, the data is read from the HDD unit 106 from the last page of the received document, and sent to the PM unit 103. After the data has undergone expansion processing/image rotation, the processed data is output to the image processing unit 100, smoothed, and printed by the printer unit 6.

Figure 5:
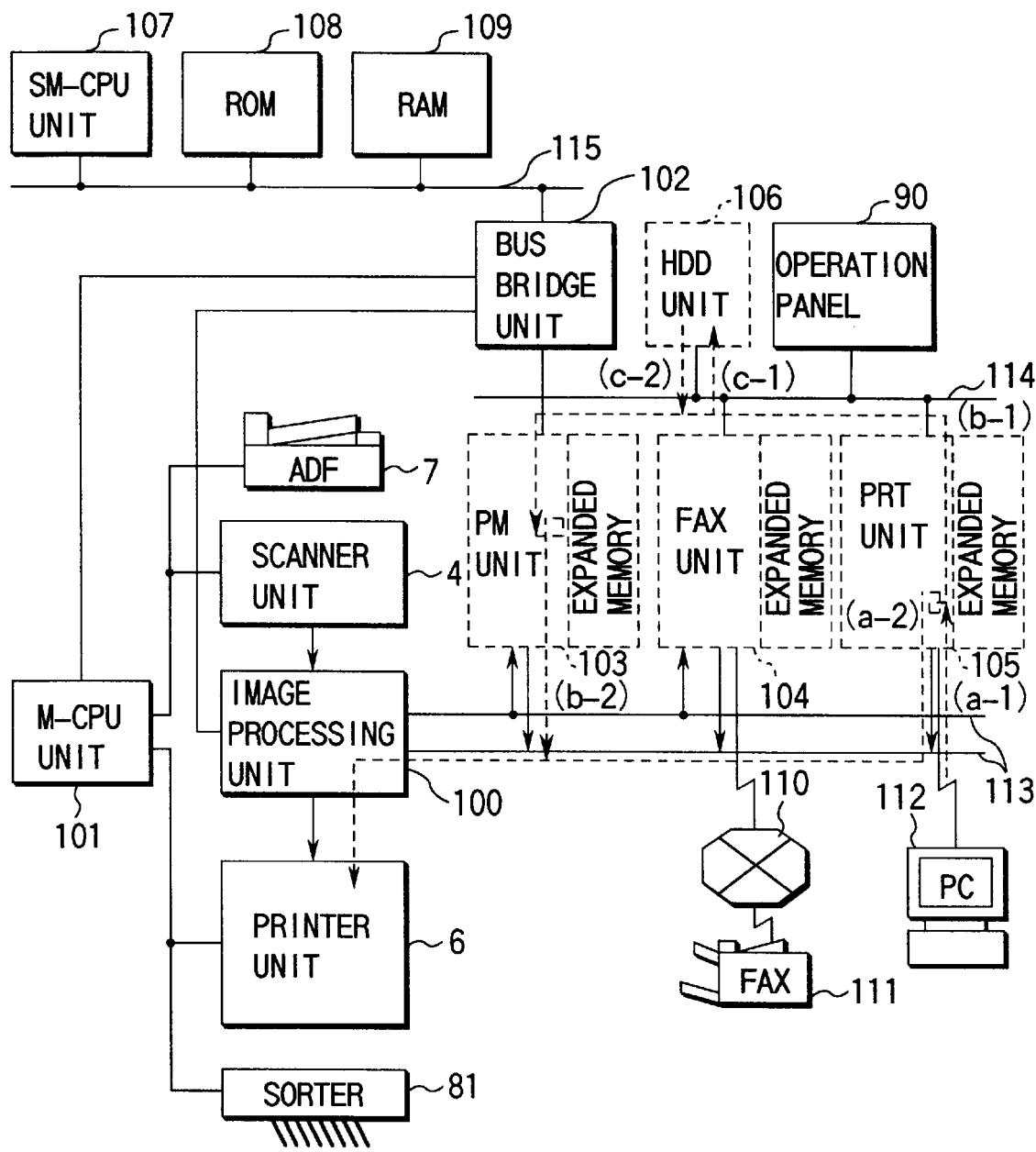

FIG. 5 shows the flow of image data upon receiving it by the printer unit 6. This flow changes basically similarly to the case of FAX reception described with reference to FIG. 4.

The minimum arrangement of the printer unit 6 is the fundamental arrangement+the PRT unit 105. At this time, while reception data are sequentially expanded by the PRT unit 105, and smoothed by the image processing unit 100 via an image bus, the data are printed by the printer unit 6.

In an arrangement of the fundamental arrangement+the PRT unit 105+the PM unit 103, data corresponding to a plurality of pages can be stored in the PM unit 103 in units of documents, and printed by the printer unit 6 at once, or printed upon reduction/editing or the like.

In an arrangement of the fundamental arrangement+the PRT unit 105+the PM unit 103+the HDD unit 106, even if the machine is used with another function such as the copying or FAX function, printer data can be received, and concurrent processing can be performed.

FIGS. 6 to 9 show the internal arrangement of the PM unit 103, and the data flow in each operation.

The interior of the PM unit 103 is divided into a system interface unit 121, a memory controller unit 122, a CODEC (compressing/expanding) unit 123, and an image interface unit 124.

The system interface unit 121 is connected to the system bus of the SM-CPU unit 107 to mediate access of the SM-CPU unit 107 to an image memory, a setting resister, and the like.

The memory controller unit 122 comprise rectangular address management units 131a to 131d for four channels, FIFO address control units 132a and 132b for two channels, a system access control unit 133, and a DRAM 134 linked to them. The memory controller unit 122 incorporates enlargement/reduction control units 135a and 135b for two channels, and rotation processing units 136a and 136b for two channels. A memory made up of the DRAM 134 is divided into a page buffer unit 137 and a code buffer unit 138, which is realized by dividing the memory area. In the memory controller unit 122, the respective channels operate independently parallel to each other.

The CODEC unit 123 has a plurality of blocks for compressing or expanding data, and operate simultaneously parallel to each other.

The image interface unit 124 has different data and sync signal lines for the printer unit 6 and the scanner unit 4 so as to allow an image input interface for the scanner unit 4 and a printer image output interface operate independently of each other.

Figure 6:
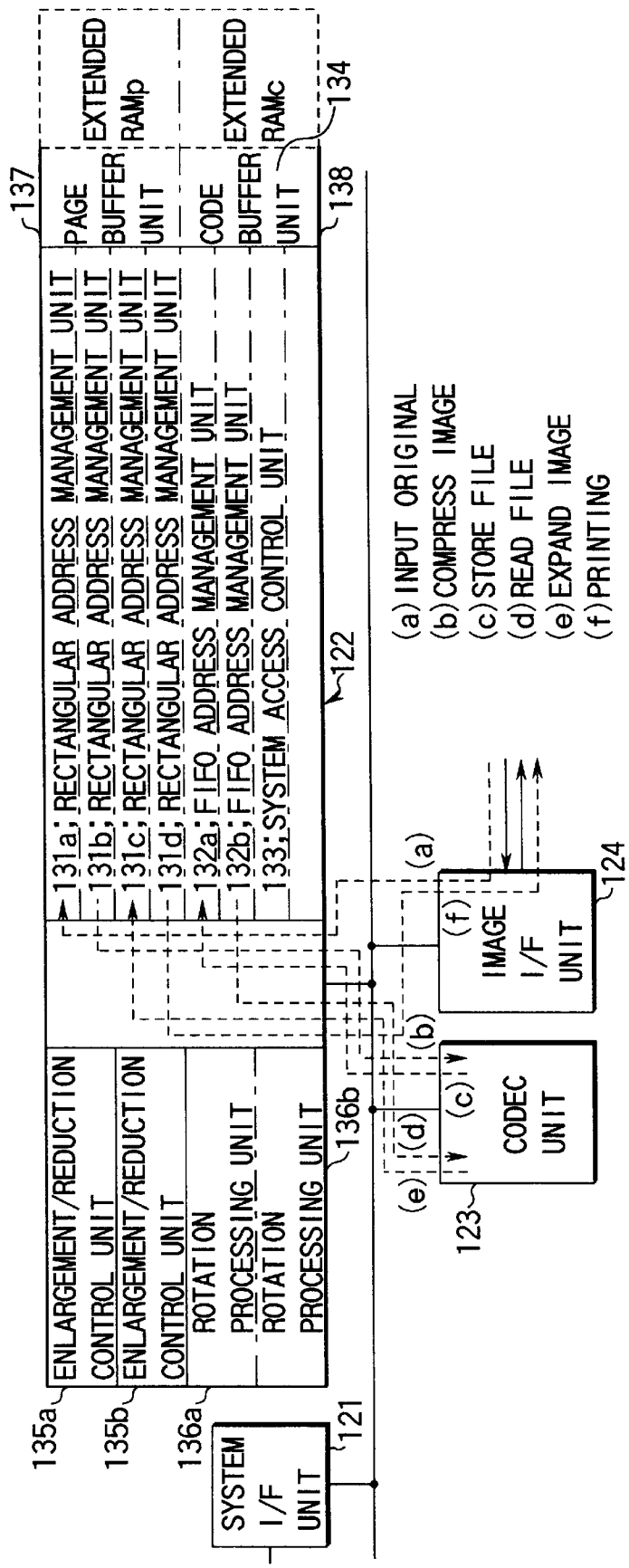
FIGS. 6 to 9 are block diagrams, respectively, showing the internal arrangement of a PM unit.

FIG. 6 shows the data flow in electronic sorting/copying in this arrangement. More specifically, data from the image processing unit 100 which is obtained by reading an original image by the scanner unit 4 is stored in a memory area managed by the rectangular address management unit 131a, i.e., the page buffer unit 137, as indicated by the broken line (a). Immediately after input of the data to the rectangular address management unit 131a starts, the contents are read by the rectangular address management unit 131b to start compression by the CODEC unit 123. In this case, the read address of the rectangular address management unit 131b does not exceed the write address of the rectangular address management unit 131a.

The compressed data is stored in a memory area managed by the FIFO address management unit 132a, i.e., the code buffer unit 138. Upon completion of the data compression for one page, the image data of the first page in the page buffer unit 137 can be erased. Accordingly, input of the image of the second page can start. In practice, almost simultaneously as the read operation for the image on the first page is completed, the compression is completed because a read upon compression is performed at a sufficiently higher speed than in a page write.

The read operation for the image on the second page upon switching originals starts immediately without having to wait for completion of compression for the first page. The operation indicated by routes (a), (b), and (c) is performed repeatedly by the number of originals to input the original data.

To output an image to the printer unit 6 in outputting a copy, after the compressed data of the first page is stored in the code buffer unit 138, the compressed data of the first page is read out by the FIFO address management unit 132b. The data is sent to the CODEC unit 123 via a route (d), and expanded.

The expanded data is stored via a route (e) in the page buffer unit 137 managed by the rectangular address management unit 131c. After a predetermined time in accordance with an original size has elapsed upon the start of the expansion/storing operation via the route (e), the contents are read out by the rectangular address management unit 131b, start to be sent to the printer unit 6, and start to be printed on the paper sheet P. The predetermined time in accordance with the original size is set by subtracting the original transmission time to the printer unit 6 from the longest time required for the expansion of the CODEC unit 123, in order to prevent the expansion speed from exceeding the printing speed. This time is determined by the paper size and the recording direction, and known in advance.

The operation indicated by routes (d), (e), and (f) can be performed for the second and subsequent pages to output one set of copies. When a plurality of sets of copies are designated, this expansion/printing/transmission can be performed again from the first page repeatedly by the designated number of sets to output the plurality of sets of copies.

Figure 7:
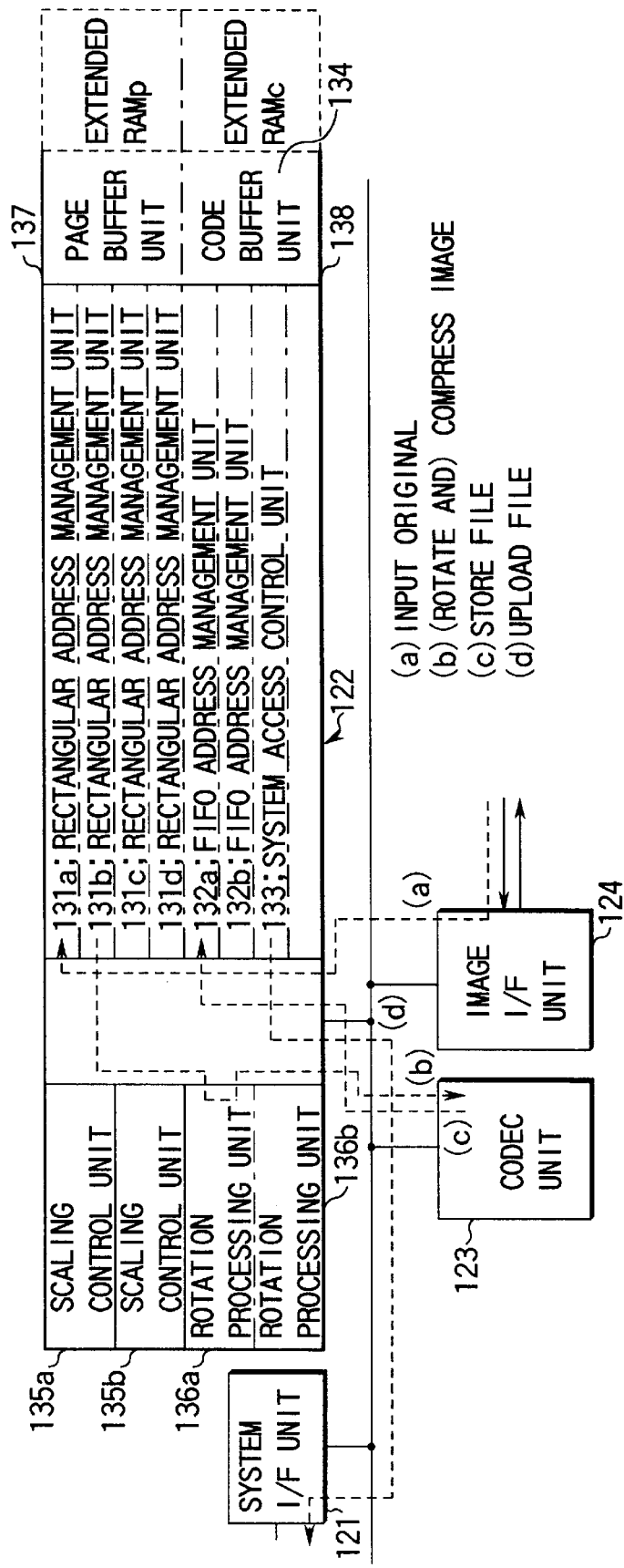

FIG. 7 shows an operation from original input to a read of compressed data from the system assuming FAX transmission.

In this case, the operation is basically the same as the image input operation in electronic sorting/copying described with reference to FIG. 6. In the FAX, however, since data must be transmitted in a direction rotated through 90° from the original read direction in normal copying, the read image must be rotated in compressing it. For this reason, upon completion of an image read operation for one page, the image data must be rotated and compressed.

More specifically, after an image read/image input operation (a) for one page is completed, the image data is rotated by the rotation processing unit 136a, and sent to the CODEC unit 123 while being read by the rectangular address management unit 131b, as indicated by a route (b). The compressed data is stored via a route (c) in the code buffer unit managed by the FIFO address management unit 132a. Upon completion of this operation, the compressed data is read by the SM-CPU unit 107 via a route (d).

Figure 8:
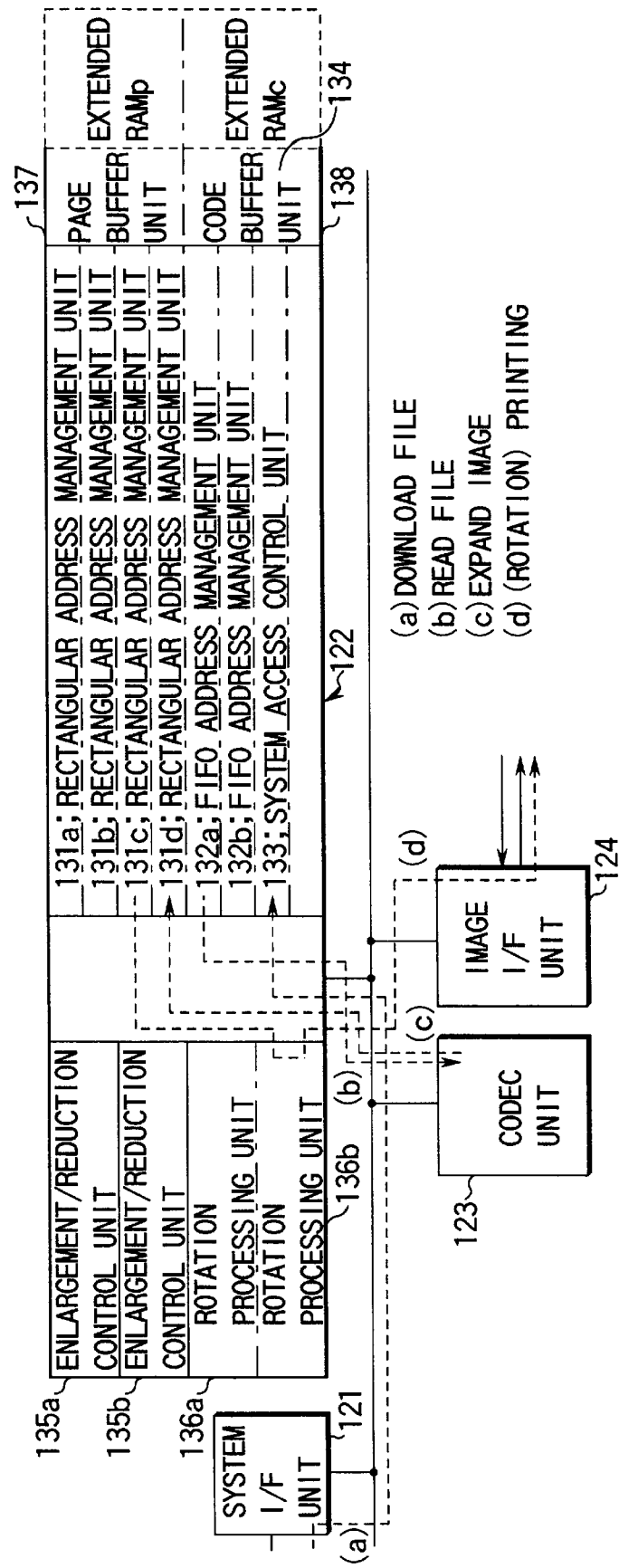

FIG. 8 shows an operation from data download to output of printing image data to the printer unit 6 assuming FAX reception.

In this case, the operation is basically the same as the image output operation in electronic sorting/copying described with reference to FIG. 6. In the FAX, by rotating reception data through 90°, the data can be printed on a paper sheet (in a cassette) normally used in copying, similar to the case of FIG. 7.

More specifically, the reception data stored in the code buffer unit via a route (a) is read out by using the FIFO address management unit 132a via a route (b), and sent to the CODEC unit 123. The data expanded by the CODEC unit 123 is mapped via a route (c) in the page buffer unit 137 managed by the rectangular address management unit 131d. The mapped data is read out by the rectangular address management unit 131c via a route (d), and processed by the rotation processing unit 136b. After that, the data is sent to the printer unit 6 via the image interface unit 124 to be printed.

Figure 9:
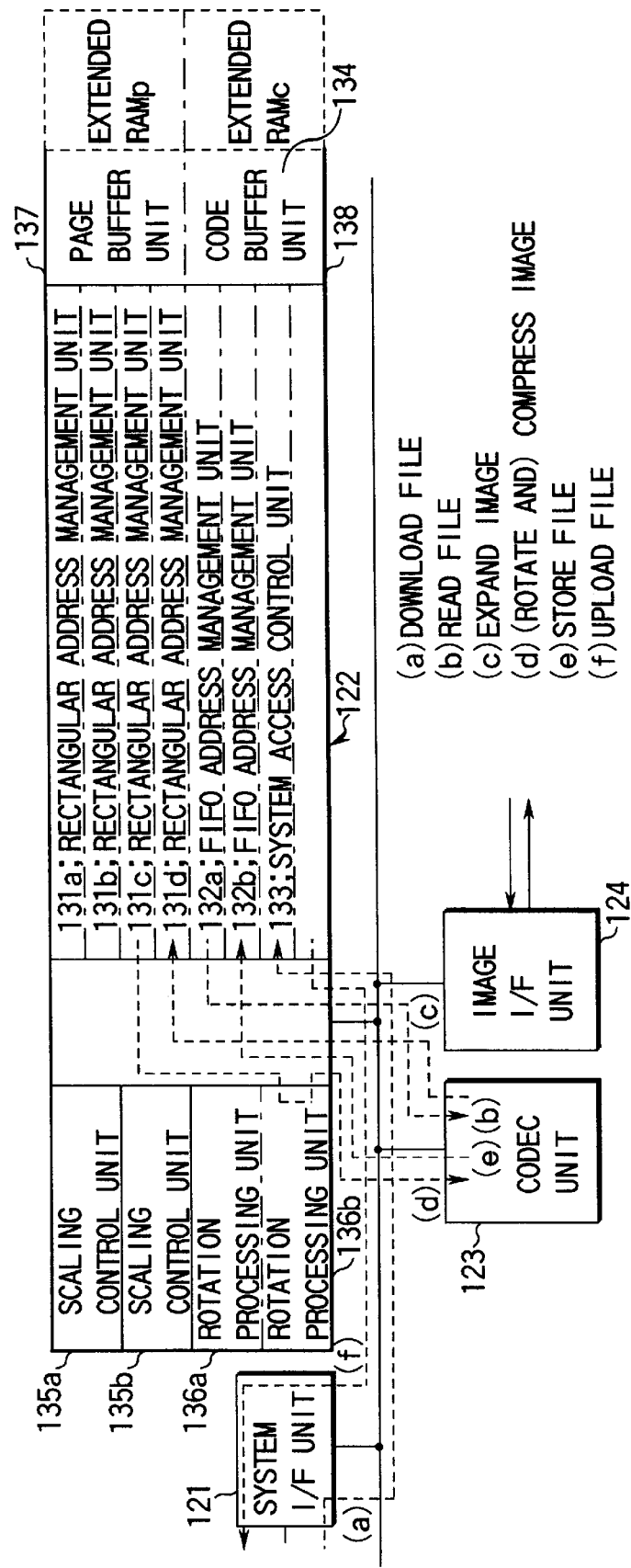

FIG. 9 shows the data flow assuming image rotation processing in FAX transmission. This operation exemplifies processing wherein, when the destination does not have any A3 reception ability in transmitting, e.g., an A3 image, the image is divided into images of two A4 pages, and the divided images are rotated and transmitted by the PM unit 103 capable of high-speed image editing to transmit the A3 image without any degradation, instead of normally reducing the A3 image to a B4 image, which degrades the image quality.

That is, a FAX transmission file is downloaded from the SM-CPU unit 107 to the PM unit 103 via a route (a), expanded via a route (b), and mapped via a route (c) in the page buffer unit 137 managed by the rectangular address management unit 131d. A4 image data half the A3 image data is rotated as indicated by a route (d), while being sent to the CODEC unit 123 and compressed again.

The re-compressed data is stored again via a route (e) in the code buffer unit 138 managed by the FIFO address management unit 132b. Then, the data is read out as transmission data by the SM-CPU unit 107, and transmitted by the FAX. The operation after a read via the route (d) is also performed for the other A4 image data to transmit the image data of two A4 pages, completing the operation. Since the complicated, time-consuming operation is processed by not a time-consuming dedicated option such as the FAX, but the PM unit 103 serving as a general-purpose option, the processing time can be shortened.

The internal arrangement of the FAX unit 104 will be described below with reference to FIGS. 10 to 14.

The FAX unit 104 controls the operation using a FAX-dedicated FAX-CPU 141 for controlling the internal system, a ROM 142 in which the control programs of the FAX-CPU 141 are written, a work RAM 143, and the like. The FAX unit 104 is constituted by a system interface unit 144 as an interface with the SM-CPU unit 107 serving as a host CPU, an NV RAM unit 145 for storing information which must be held upon turning off the power supply, i.e., communication log information, the destination telephone number and name information, and the like, a code buffer RAM unit 146 for storing transmission/reception data in the form of compressed data, a page buffer RAM unit 147 for temporarily storing transmission/reception data in an image read operation or printing, a rotation editing unit 148 for performing rotation and the like of the data in the page buffer RAM unit 147, a CODEC unit 149 for compressing/expanding image data, a MODEM unit 150 for modulating transmission data in accordance with an analog line, and demodulating the modulated data to reception data, and an NCU unit 151 for converting high-voltage signals of the MODEM unit 150 and a public line in two ways.

In a normal case, a local bus 152 of the page buffer RAM unit 147 and the rotation editing unit 148 is connected to a system bus 153 of the FAX-CPU 141. Only in rotation editing, the local bus 152 is disconnected from the system bus 153 to increase the efficiency of the rotation editing operation.

That is, only in rotation editing, the local bus 152 is disconnected by a bus switch unit 154 while the rotation editing unit 148 itself accesses the page buffer RAM unit 147, and sends back the result of the rotation processing to the page buffer RAM unit 147 again. With this setting, the local bus 152 does not continuously disturb the system bus 153. At this time, the FAX-CPU 141 cannot access the page buffer RAM unit 147, but can operate free from any limitation. If the bus switch unit 154 is switched on, the FAX-CPU 141 can access the page buffer RAM unit 147 as a normal memory.

The FAX-CPU 141 also incorporates a DMA function, and uses it in operation using the CODEC unit 149 such as compression, expansion, and code conversion, or operation using the system interface unit 144 such as exchange of transmission/reception data with the SM-CPU unit 107. The rotation editing unit 148 also incorporates a DMA function, and uses it in exchange of image data with the scanner unit 4 and the printer unit 6, rotation editing, or data transfer between an image interface unit 155 and the page buffer RAM unit 147 or the rotation editing function and the page buffer RAM unit 147.

The code buffer RAM unit 146 and the page buffer RAM unit 147 incorporate a function of extending the memory capacity, thereby suppressing the cost of the fundamental arrangement low. For example, in this embodiment, the memory capacity of the page buffer RAM unit 147 in the fundamental arrangement is set to 1 MB as a capacity corresponding up to an A3 original at low resolutions (8×3.85 and 8×7.7) in FAX transmission/reception, whereas the memory capacity of the code buffer RAM unit 146 is to 1 MB capable of storing, e.g., 100 compressed low-resolution originals.

The page buffer RAM unit 147 and the code buffer RAM unit 146 can respectively be extended to +3 MB and +1 MB such that the memory capacity of the page buffer RAM unit 147 is extended to 4 MB corresponding up to an A3 original at a high resolution (16×15.4), and that of the code buffer RAM unit 146 is to 2 MB capable of storing 100 compressed high-resolution originals.

An operation in original image scanning and FAX transmission in the above arrangement will be explained with reference to FIG. 10. This operation is equivalent to (a) in FIG. 3.

An image read by the scanner unit 4 is input from the image interface unit 155 to the page buffer RAM unit 147 via a route (a). If the image must be rotated, the image is rotated through 90° by the rotation editing unit 148 via routes (b) and (c). The image data is sent to the CODEC unit 149 via a route (d), and stored as a compressed file in the code buffer RAM unit 146 via a route (e). When the read operation of the original D starts, the FAX-CPU 141 controls and connects the NCU unit 151 to a line, and sends a signal indicating a destination number to connect the FAX to a receiving FAX.

The FAX-CPU 141 determines the communication resolution, the transmission original size, the transmission speed, the transmission compression code type, and the like by negotiations to start transmitting the compressed data. Transmission data is the one stored in the code buffer RAM unit 146. To add transmission time information, source information, and the like as data to the transmission data, the data is temporarily expanded by the CODEC unit 149 every transmission. While adding an information image, the expanded data is compressed again with a compression code determined in negotiation with the destination. Meanwhile, the re-compressed data is stored in the code buffer RAM unit 146, transferred to the MODEM unit 150, and sent to the line. Routes (g) and (h) represent this.

An operation in FAX reception using the FAX unit 104 and printing will be explained with reference to FIG. 11. This operation is equivalent to (a-1) and (a-2) in FIG. 4.

The FAX-CPU 141 determines upon detection by the NCU unit 151 that a connection request is sent from a public line, and informs the SM-CPU unit 107 of this. Upon reception of a connection grant from the SM-CPU unit 107, the FAX-CPU 141 switches the NCU unit 151 to the line side, and sends a FAX response signal to the line side. If the sending system is a FAX, the FAX-CPU 141 determines the reception speed, the reception resolution, the reception image size, the reception compression code, and the like by negotiations, similar to transmission. The FAX-CPU 141 receives compressed data, and stores it in the code buffer RAM unit 146 via a route (a).

To check the validity of the data, the received code is sent to the CODEC unit 149 to be subjected to expansion check (b). At the same time, the code is converted to one having the highest compression efficiency, and the converted code is restored in the code buffer RAM unit 146 (c). When the code corresponding to one page has been received, the code is expanded for printing (d). The expanded date is mapped in the page buffer RAM unit 147 (e).

If the data must be rotated, the printing data mapped in the page buffer RAM unit 147 is rotated by the rotation editing unit 148 in accordance with the direction of the paper sheet set at the printer unit 6 (f, g). The data of the page buffer RAM unit. 147 is sent to the printer unit 6 via the image interface unit 155 (h) to be printed on the paper sheet P.

An operation when, in scanning an original, an image is input via not the page buffer RAM unit 147 of the FAX but the PM unit 103 will be explained with reference to FIG. 12. This operation is equivalent to (b) and (c) in FIG. 3.

Transmission data read and compressed by the PM unit 103 is downloaded to the code buffer RAM unit 146 in the FAX unit 104 via the system interface unit 144(a). Similar to the transmission operation in the arrangement with only the FAX unit 104, while transmission time information and source information are added, and the compression code is converted (b, c) upon completion of line connection and negotiation, the downloaded data is transmitted to a receiving FAX (d).

In this operation, i.e., in the arrangement having the PM unit 103 as an option, no page buffer RAM unit 147 is used. For this reason, in the arrangement having the PM unit 103, the transmission/reception buffer capacity in the fundamental arrangement can be increased by using the page buffer RAM unit 147 as an extended portion of the code buffer RAM unit 146.

Figure 13:
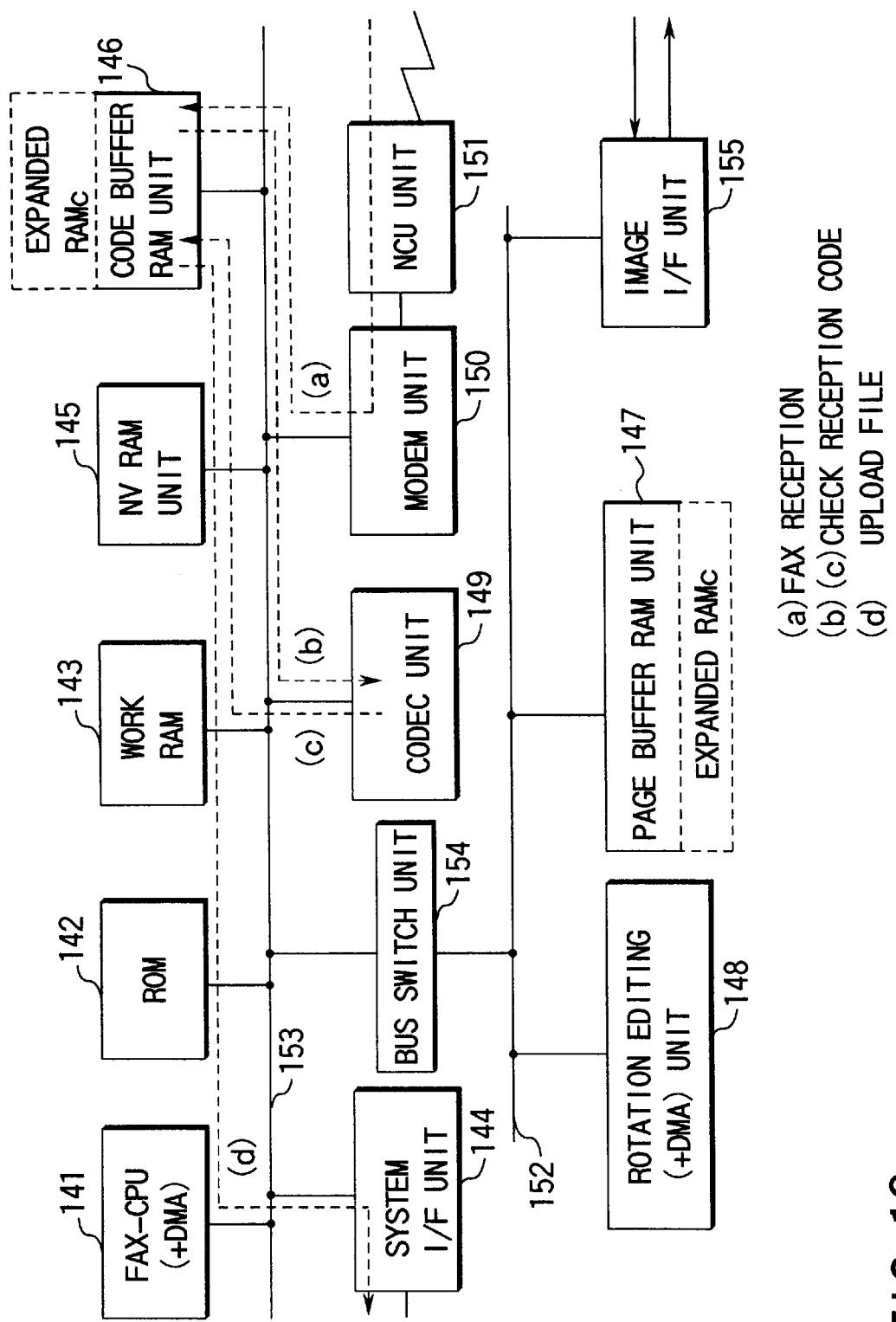

An operation when printing upon FAX-receiving data is performed via not the page buffer RAM unit 147 of the FAX unit 104 but the PM unit 103 will be explained with reference to FIG. 13. This operation is equivalent to (b-1), (b-2), (c-1), and (c-2) in FIG. 4.

Similar to the reception operation in the arrangement with only the FAX unit 104, after line connection and negotiation, compressed data is received by the code buffer RAM unit 146 (a). During the reception, the received code data is subjected to code check/code conversion (b, c). Data determined to be free from any abnormality upon completion of the reception of data corresponding to one page is stored internally for a while or quickly sent in accordance with determination of the SM-CPU unit 107. In any case, the data is finally uploaded to the SM-CPU unit 107 side (d).

Figure 12:
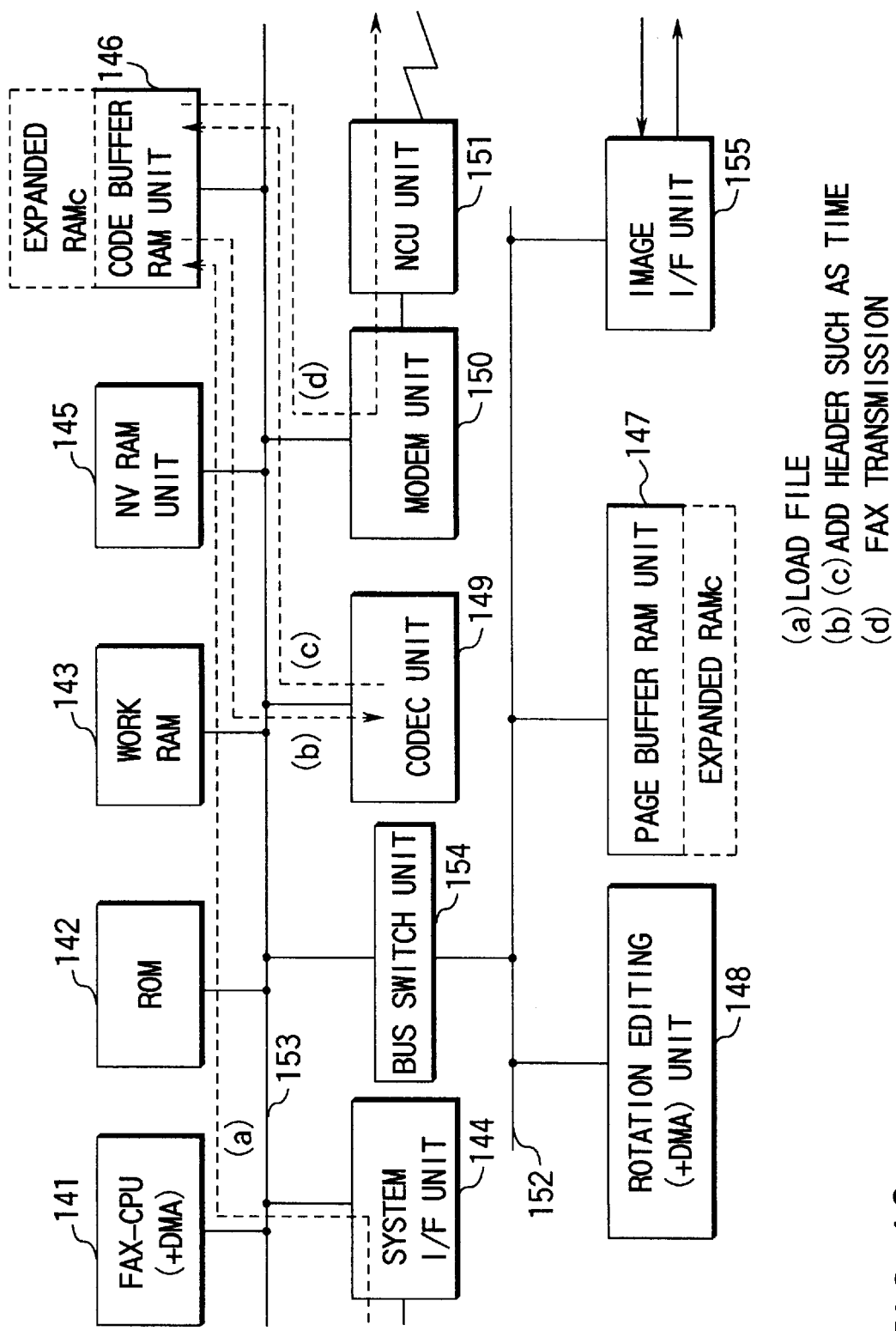

Also in this operation, since the page buffer RAM unit 147 is not used as a page buffer, similar to the case of FIG. 12, it is used as an extended portion of the code buffer RAM unit 146.

DMA control in the FAX unit 104 will be described with reference to FIG. 14.

Generally, in transferring data at a high speed, DMA is performed, of resources managed by the FAX-CPU 141 by hardware, between memories, a memory and an IO, or IOs not using any transfer instruction of the FAX-CPU 141. Accordingly, when data of a certain or larger amount is to be transferred, the data can be processed at a higher speed than in the case using the transfer instruction of the FAX-CPU 141.

In this embodiment, the routes shown in FIGS. 10 to 13 are used for "(1) transfer of FAX transmission/reception data between the SM-CPU unit 107 and the FAX unit 104", "(2) compression/expansion/code check/code conversion/source information adding operations using the CODEC unit 149", "(3) transfer of image data between the image interface unit 155 and the page buffer RAM unit 147 in inputting/outputting an image between the scanner unit 4, the printer unit 6, and the FAX unit 104", and "(4) transfer between the page buffer RAM unit 147 and the rotation editing unit 148 in rotating an image in the page buffer RAM unit 147".

In "(1) transfer of FAX transmission/reception data between the SM-CPU unit 107 and the FAX unit 104", the system interface unit 144 outputs a DMA request signal to the SM-CPU unit 107 and the FAX-CPU 141, and performs DMA transfer in accordance with DMA response signals from them.

In transferring data from the SM-CPU unit 107 to the code buffer RAM unit 146, the system interface unit 144 outputs a DMA request signal to the SM-CPU unit 107, and receives compressed data sent in accordance with a DMA response signal. The received data is latched by an intermediate buffer 144a inside the system interface unit 144.

When the data is latched by the intermediate buffer 144a, the system interface unit 144 sets a signal (a) DREQ1 shown in FIG. 14 serving as a DMA request signal to true and outputs it to the FAX-CPU 141. The system interface unit 144 outputs, to a data bus, the data latched by the internal intermediate buffer 144a in correspondence with a signal (b) DACK1 serving as a response signal from the FAX-CPU 141. Then, the data is written in the code buffer RAM unit 146 in accordance with an address output from a DMA controller 141a in the FAX-CPU 141.

When the internal intermediate buffer 144a becomes empty, the system interface unit 144 outputs a DMA request signal to the SM-CPU unit 107 again, and tries to receive next data. By repeatedly performing the above operation, data is transferred from the SM-CPU unit 107 to the code buffer RAM unit 146.

To the contrary, data is transferred from the code buffer RAM unit 146 to the SM-CPU unit 107 in the following order. The system interface unit 144 changes the signal (a) DREQ1 to the FAX-CPU 141 to be true. The code buffer RAM unit 146 outputs reception data in accordance with an address output from the FAX-CPU 141 in response to the signal DREQ1. At the same time, the system interface unit latches the reception data in the internal intermediate buffer 144a in response to a signal (b) DACK1 output from the FAX-CPU 141.

After the data is latched by the internal intermediate buffer 144a, the system interface unit 144 outputs a DMA request signal to the SM-CPU unit 107, and outputs the data of the intermediate buffer 144a to the data bus on the SM-CPU unit 107 side in accordance with a DMA response signal from the SM-CPU unit 107. As a result, the SM-CPU unit 107 receives the reception data.

When the SM-CPU unit 107 receives the data, it outputs a signal (a) DREQ1 to the FAX-CPU 141 again in order to receive next data. By repeatedly performing this operation, e.g., FAX reception data is uploaded to the SM-CPU unit 107.

In "(2) performing compression/expansion using the CODEC unit 149", the CODEC unit 149 outputs a DMA request signal (c) DREQ2 to the FAX-CPU 141. In response to this, the FAX-CPU 141 outputs a signal (d) DACK2 while outputting a RAM address. In accordance with this, the CODEC unit 149 reads and writes data. The CODEC unit 149 always uses signals DREQ and DACK of two channels.

More specifically, the CODEC unit 149 also simultaneously uses signals (e) DREQ3 and (f) DACK3. In data compression, the CODEC unit 149 uses a 1st-channel DMA signal to read bitmap data of the page buffer RAM unit 147. The CODEC unit 149 writes the result of the compression as a compressed file in the code buffer RAM unit 146 by using the 2nd-channel DMA signal.

In data expansion, the data is transferred from the code buffer RAM unit 146 to the page buffer RAM unit 147.

In converting the code of compressed data or adding source information, the data is transferred from the page buffer RAM unit 147 to the code buffer RAM unit 146.

Figure 10:
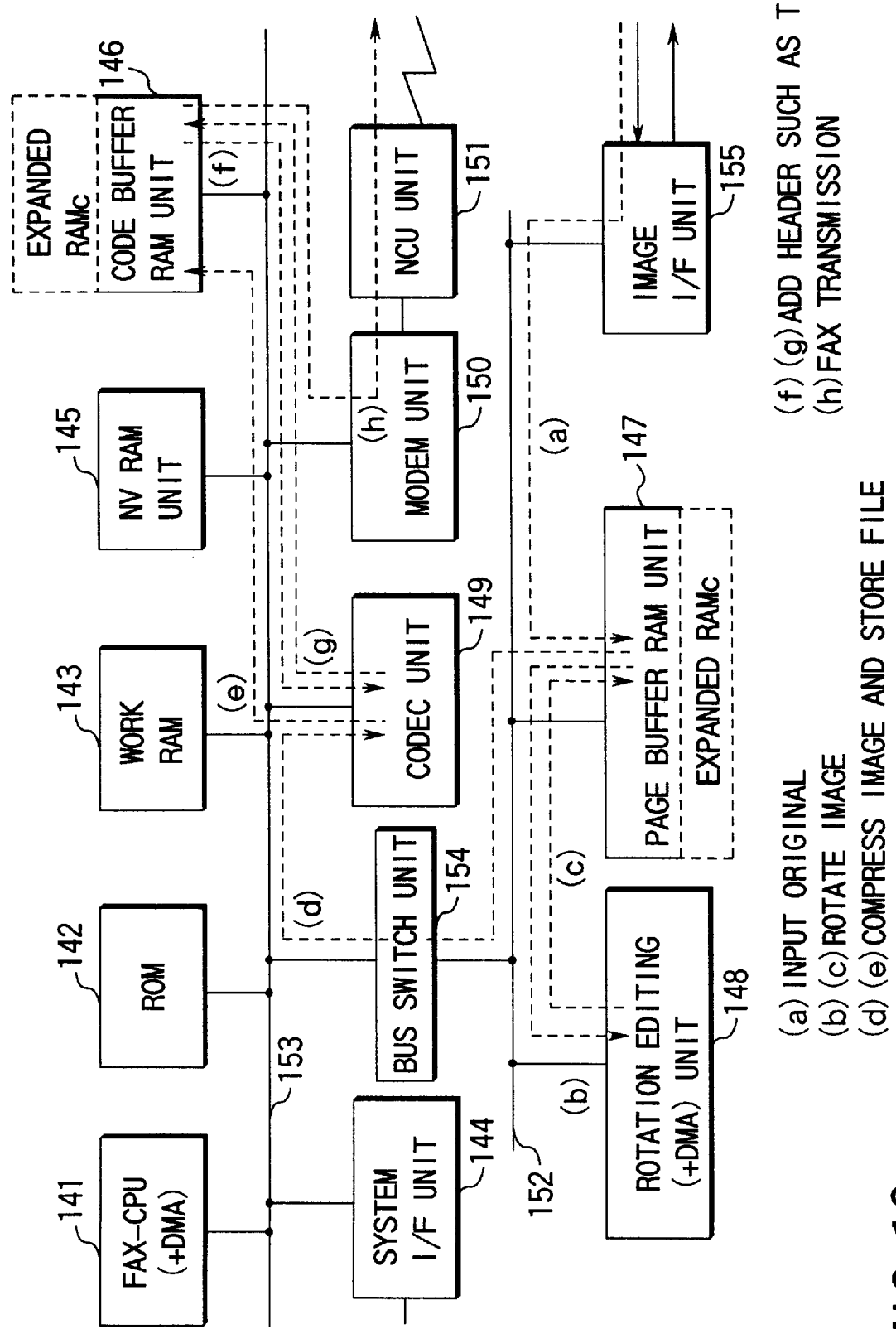
Figure 11:
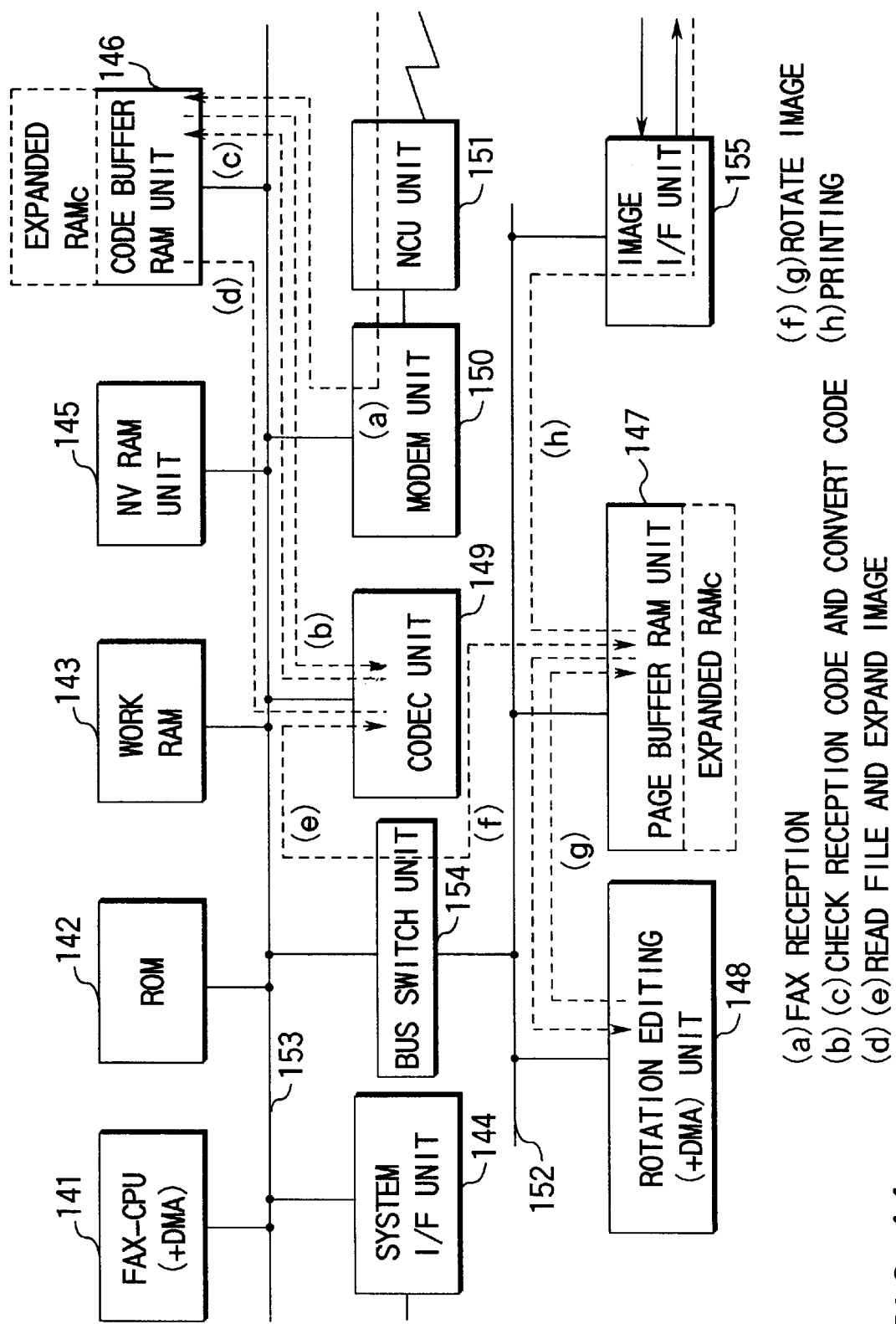

In practice, as shown in FIGS. 10 and 11, the CODEC unit 149 of this embodiment has four pairs of DMA signals so as to simultaneously perform compression of read image and addition of source information/code conversion and FAX transmission, or FAX reception code check and code expansion/printing. For the sake of simplicity, the four pairs of DMA signals are not illustrated in FIGS. 10 and 11.

An operation in "(3) inputting image data via the scanner unit 4 using the image interface unit 155, and outputting it to the printer unit 6" will be described.

In inputting an image, when the image interface unit 155 receives image data by a bit width constituting the page buffer RAM unit 147, it outputs a DMA request signal (k) DREQL1 to the rotation editing unit 148. In response to this, the rotation editing unit 148 outputs a signal (i) BREQ1 requesting bus access to the FAX-CPU 141.

The FAX-CPU 141 stops its external bus operation as long as the operation does not have primal priority set internally, and outputs a signal (k) BGNT1 granting bus access to the rotation editing unit 148. Upon reception of this, the rotation editing unit 148 outputs a given address of the page buffer RAM unit 147, and outputs a response signal (l) DACKL1. Upon reception of the signal (l) DACKL1, the image interface unit 155 outputs the image data. The image data is written in the page buffer RAM unit 147.

The above description is based on the assumption that the bus switch unit 154 is switched on to connect the local bus 152 on the page buffer RAM unit 147 side to the system bus 153 on the FAX-CPU 141 side. If the bus switch unit 154 is switched off by an instruction from the FAX-CPU 141, the signal (i) BREQ1 from the rotation editing unit 148 is sent back as a signal (j) BGNT1.

That is, when the local bus 152 is disconnected from the system bus 153 on the FAX-CPU 141 side, it can be freely used. In this state, image input/output, and image rotation (to be described later) can be performed independently of FAX transmission/reception. However, compressed data and bitmap image data cannot be converted. By controlling the connection/disconnection state of the bus switch unit 154, concurrent operation and multiple operation can be switched.

In the ON state of the bus switch unit 154, a signal (g) BREQ1bf reflects the signal (i) BREQ1, whereas the signal (j) BGNT1 reflects the signal (h) BGNT1bf. In the OFF state, the signal (g) BREQ1bf always becomes "false", and as a result, the signal (h) BGNT1bf also always becomes "false".

In outputting an image to the printer unit 6 using the image interface unit 155, data flows in a reverse direction, but the sequence of flowing the DMA signal is the same as in inputting an image.

"(4) Image rotation in the page buffer RAM unit 147" will be described. At this time, the rotation editing unit 148 itself has DMA request signals corresponding to two channels, and externally outputs the signal (i) BREQ1 upon reception of them. The subsequent operation is the same as image input/output using the image interface unit 155.

That is, an image received from the page buffer RAM unit 147 is input in the rotation editing unit 148 using the first channel. After rotating the image, the rotated image data is restored in another location in the page buffer RAM unit 147 using the second channel.

By combining the above operations, compression/expansion processing of image data, FAX transmission/reception, and input/output of an image are performed parallel to each other in the FAX unit 104.

The difference between control flows will be explained by exemplifying the FAX system.

FAX task processing will be described with reference to a flow chart shown FIG. 15.

For example, a control procedure for controlling FAX transmission/reception is transmitted to the FAX unit 104 when the power supply is first turned on after it is turned off, which may change the system configuration.

More specifically, when the power supply is turned off (ST1), the FAX unit 104 is reset (ST2) to get option information (ST3).

From the option information, if the arrangement does not have any PM unit 103 (ST4), the FAX unit 104 must perform both input of an original and printing of reception data, and both FAX transmission and reception processes by itself. The FAX unit 104 is instructed to operate independently (ST5).

From the option information, if YES in ST4, no PM extended memory for storing a FAX transmission/reception file exists (ST7), and no HDD unit 106 also exists (ST8), the FAX unit 104 is instructed to operate in a mode wherein storage of a transmission/reception file is performed within the FAX unit 104, and only input/output of an image is performed in the PM unit 103 (ST6 and ST9).

If YES in ST4, and YES in ST7 or YES in ST8 even if NO in ST7, the FAX unit 104 is instructed to operate in a mode wherein storage of a transmission/reception file is performed outside the FAX unit 104, and the FAX unit 104 performs only FAX transmission/reception (ST6, ST10, and ST11).

The setting of the FAX operation mode does not change unless the power supply is turned off (ST1).

If a new transmission request is generated (ST12), or during transmission processing (ST13), the transmission is continued (ST14). If a new reception request is generated (ST15), or during reception processing (ST16), the reception is continued (ST17).

Transmission processing will be described with reference to flow charts shown in FIGS. 16 to 21.

When the transmission mode is set upon depressing the start button (ST21), whether the setting items are correctly set is checked by UI processing (User Interface processing) (ST22). If NO in ST22, the control returns to the setting routine (ST23).

If transmission suspension had occurred, and the control had branched once (ST24), the control jumps to the step where the suspension was generated, in order to execute processing therefrom.

If time-designated transmission is set (ST25), another processing (ST26) must be performed, and the control shifts to another routine, description of which is omitted.

At the start of transmission, if the ADF 7 cannot detect any original D (ST27), the control returns to a UI reprocessing -request for requesting the user to set the original D (ST28).

If YES in ST27, the ADF 7 is instructed to feed the original D to the scanner unit 4 (ST29), and the result of original size detection obtained accordingly is received (ST30).

The processing flow subsequent to the above processing changes depending on the form of the system configuration.

Figure 16:
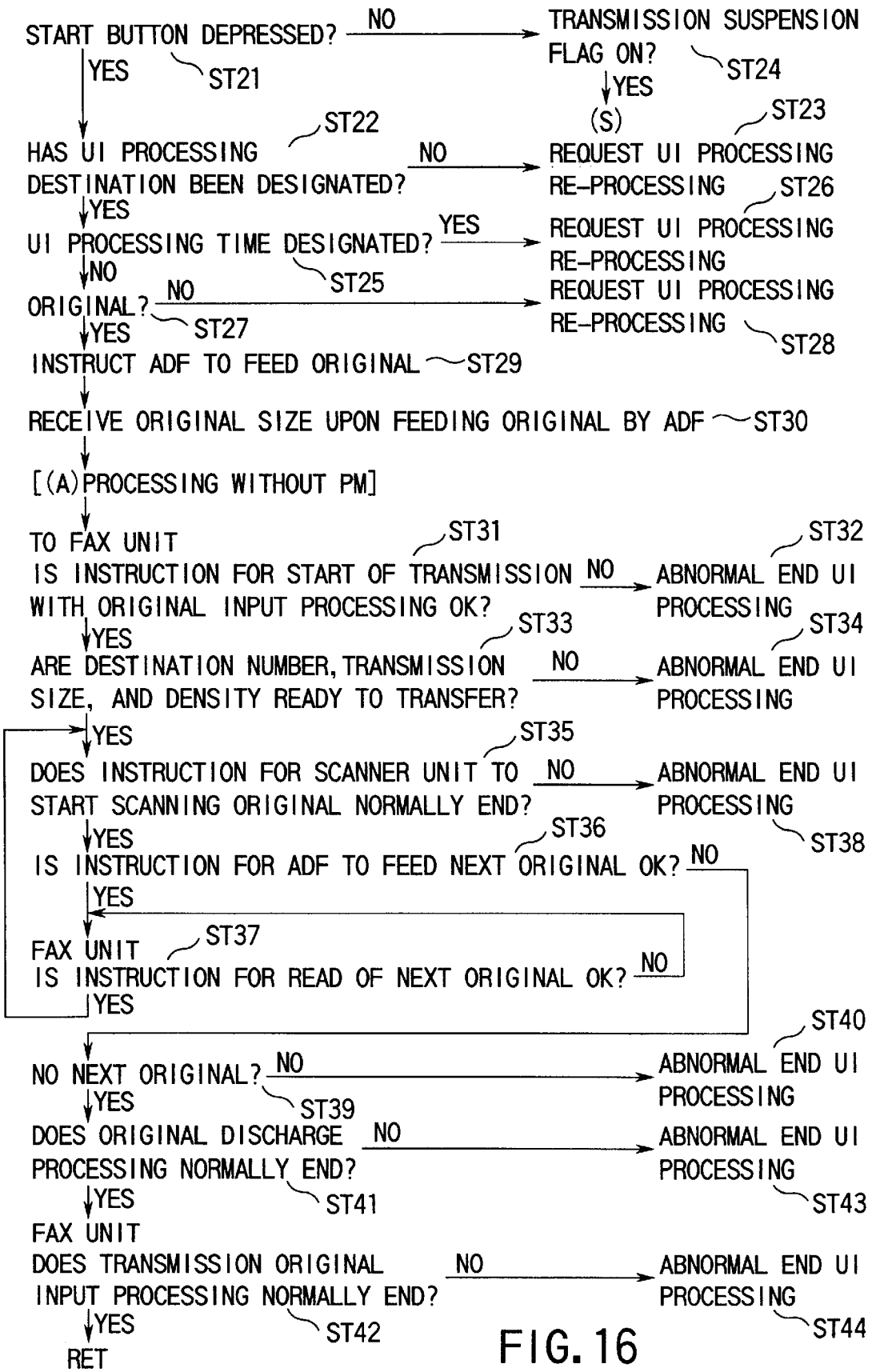
FIG. 16 is a flow chart for explaining transmission processing.

As processing (A) subsequent to step 30, processing when no PM unit 103 exists will be described with reference to a flow chart in FIG. 16. In this case, the FAX unit 104 performs all original input, file storage, and FAX transmission processing.

A transmission start instruction with original input processing is output to the FAX unit 104 to check a response "OK" (ST31). If NO in ST31 because some processing such as FAX reception/printing is in progress in the FAX unit 104, the user is informed of this, and the control returns to abnormal end UI processing to temporarily end the processing (ST32).

If YES in ST31, transmission condition information such as destination number information, transmission original size information, and density information is transferred.

Although no abnormality generally occurs at this time, abnormality processing can be performed (ST33 and ST34).

After transferring the transmission condition information, the scanner unit 4 is instructed to start scanning the first original. If the processing normally ends upon reception of this instruction (ST35), the scanner unit 4 outputs an image transfer sync signal. In accordance with the sync signal, the FAX unit 104 receives image data, and starts transmission upon compression processing. When the ADF 7 is instructed to feed an original, it feeds originals so long as originals D remain. Upon completion of the original feed, the ADF 7 replies "OK" (ST36).

If an original or originals D are determined to remain, the FAX unit 104 is instructed to read the next original. Upon completion of preparation for reading the next original, the FAX unit 104 replies "OK" (ST37). If YES in ST37, the scanner unit 4 is instructed to start scanning the original, similar to the first original. In accordance with this, an original image is automatically transferred (ST35). This operation is repeatedly performed until no original D is present on the ADF 7 (ST35 to ST37).

If NO in step 35, the control returns to abnormal end UI processing (ST38).

If no original D is present on the ADF 7, the ADF 7 does not reply "OK" (normal end) for the original feed instruction (ST36). As a result, it is determined that no original D is present (ST39).

If the ADF 7 does not reply "OK" owing to a reason other than the absence of an original D, an abnormality such as paper jam may have occurred (ST40).

If YES in ST39, whether the last read original D is normally discharged from the ADF 7 is checked (ST41). After confirming that the original read processing to the FAX unit 104 has normally ended (ST42), the transmission processing ends.

If NO in ST41, the control returns to abnormal end UI processing (ST43). If NO in ST42, the control returns to abnormal end UI processing (ST44).

Figure 17:
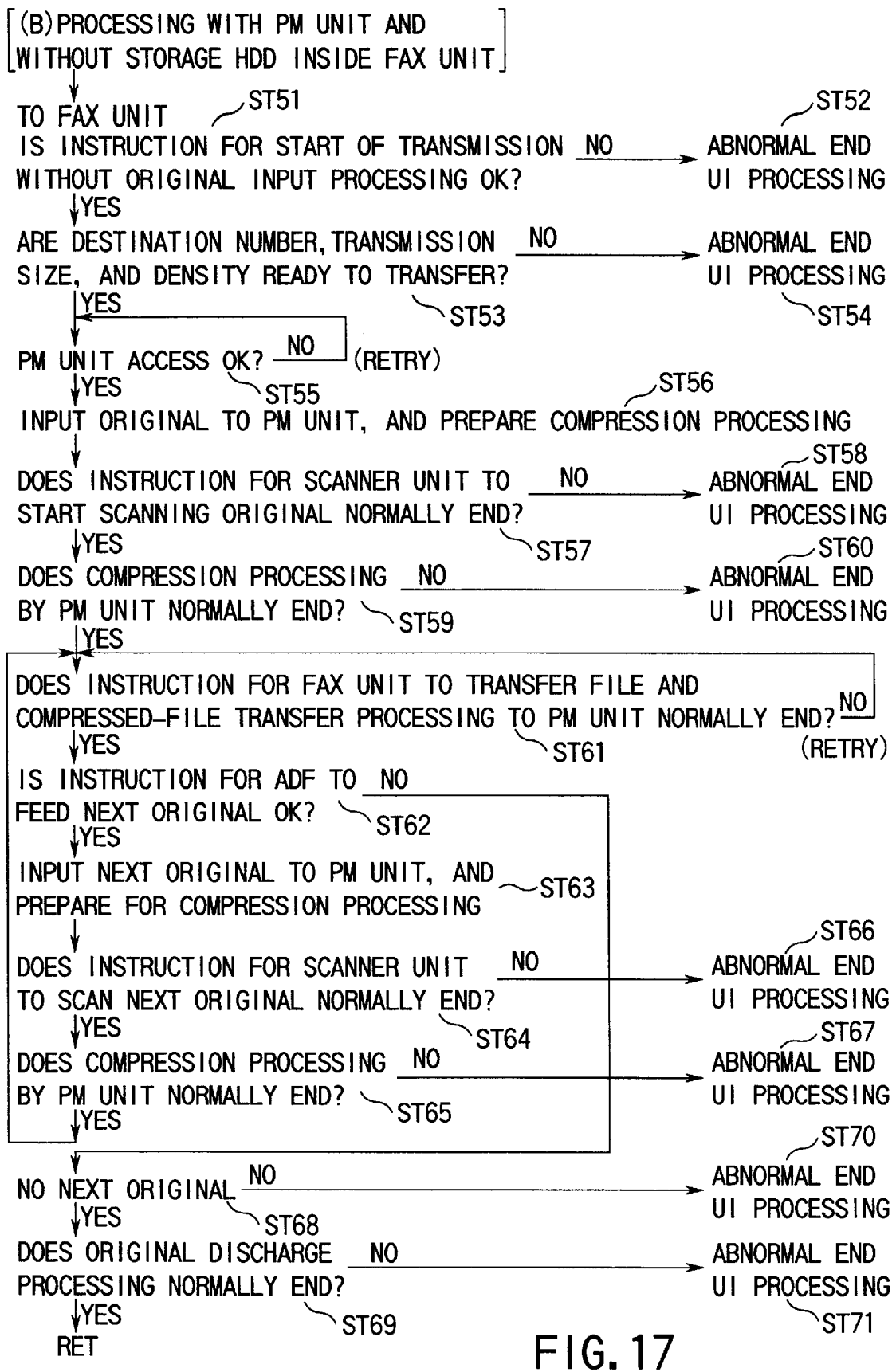
FIG. 17 is a flow chart for explaining processing performed when the PM unit exists, and neither a PM unit extended memory for the FAX unit nor an HDD unit exists in transmission processing.

As processing (B) subsequent to step 30, processing when the PM unit 103 exists, and neither a PM extended memory for the FAX unit 104 nor the HDD unit 106 exists, only original input is performed via the PM unit 103, and storage of a transmission file and FAX transmission processing are performed by the FAX unit 104 will be described with reference to a flow chart in FIG. 17.

Substantially similar to the processing (A), it is inquired whether the FAX unit 104 can start transmission. If the FAX unit 104 replies "OK", the destination number, the transmission original size, and the transmission density are transmitted. Upon completion of the inquiry and instruction to the FAX unit 104, whether the PM unit 103 is in the process of copying or the like is checked. If the PM unit 103 is free, original input and compression are prepared for. The scanner unit 4 is instructed to scan an original, thereby receiving image data in the PM unit 103.

Also at this time, the reception of data in the PM unit 103, and compression of the received data are automatically performed in response to an image transfer sync signal from the scanner unit 4. After checking whether the image compression has normally ended, the compressed file is transferred to the FAX unit 104 in units of pages. Upon completion of this operation, processing for the next and subsequent pages, i.e., feed of an original by the ADF 7, setting of the PM unit 103, scanner operation, check of compression, and transfer of a file to the FAX unit 104 are repeatedly performed until no original D is present on the ADF 7. If no original D is present, the original is discharged to end the transmission processing routine.

More specifically, a transmission start instruction with original input processing is output to the FAX unit 104 to check a reply "OK" (ST51). If NO in ST51 because some processing such as FAX reception/printing is in progress in the FAX unit 104, the user is informed of this. To temporarily end the processing, the control returns to abnormal end UI processing (ST52).

If YES in ST51, transmission condition information such as destination number information, transmission original size information, and density information is transferred.

Although no abnormality generally occurs at this time, abnormality processing can be performed (ST53 and ST54).

After transferring the transmission condition information, whether the PM unit 103 is in the process of copying or the like is checked (ST55). If the PM unit 103 is free, original input and compression are prepared for (ST56).

The scanner unit 4 is instructed to start scanning the first original. If the processing normally ends upon reception of this instruction (ST57), the PM unit 103 receives image data from the scanner unit 4.

Also at this time, the reception of data in the PM unit 103, and compression of the received data are automatically performed in response to an image transfer sync signal from the scanner unit 4. After checking whether the image compression has normally ended (ST59), the FAX unit 104 is instructed to transfer the file. The compressed file is transferred to the PM unit 103, and whether the processing normally ends is checked (ST61).

If NO in step 57 or 59, the control returns to abnormal end UI processing (ST58 or ST60).

If YES in ST61, and the ADF 7 is instructed to feed an original, the ADF 7 feeds originals as far as an original or originals D remain. Upon completion of the original feed, the ADF 7 replies "OK" (ST62).

If an original D is determined to remain, the next original is input to the PM unit 103, and compression processing is prepared for (ST63). The scanner unit 4 is instructed to start scanning the original. If the processing normally ends (ST64), compression processing is performed in the PM unit 103. If the compression processing normally ends (ST65), the control returns to step 61.

If NO in step 64 or 65, the control returns to abnormal end UI processing (ST66 or ST67).

If no original D is present on the ADF 7, the ADF 7 does not reply "OK" (normal end) for the original feed instruction (ST62). As a result, it is determined that no original D is present (ST68).

If the ADF 7 does not reply "OK" owing to a reason other than the absence of the original D, an abnormality such as paper jam may have occurred (ST70).

If YES in ST68, whether the last read original D is normally discharged from the ADF 7 is checked (ST69) to end the transmission processing.

If NO in ST69, the control returns to abnormal end UI processing (ST71).

Figure 18:
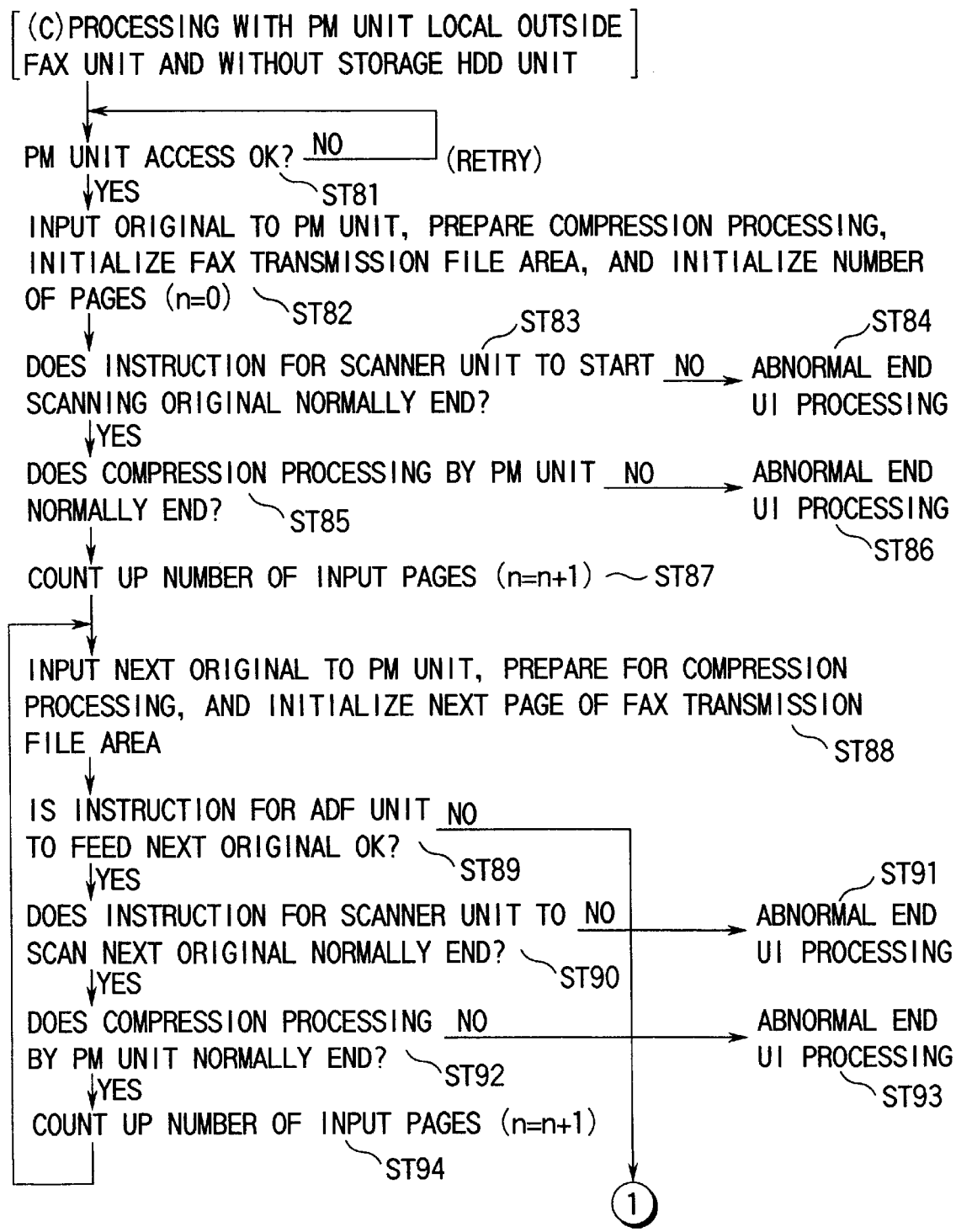
FIGS. 18 and 19 are flow charts, respectively, for explaining processing performed when the PM unit located outside the FAX unit and used for storing image data exists, and no storage HDD unit exists in transmission processing.
Figure 19:
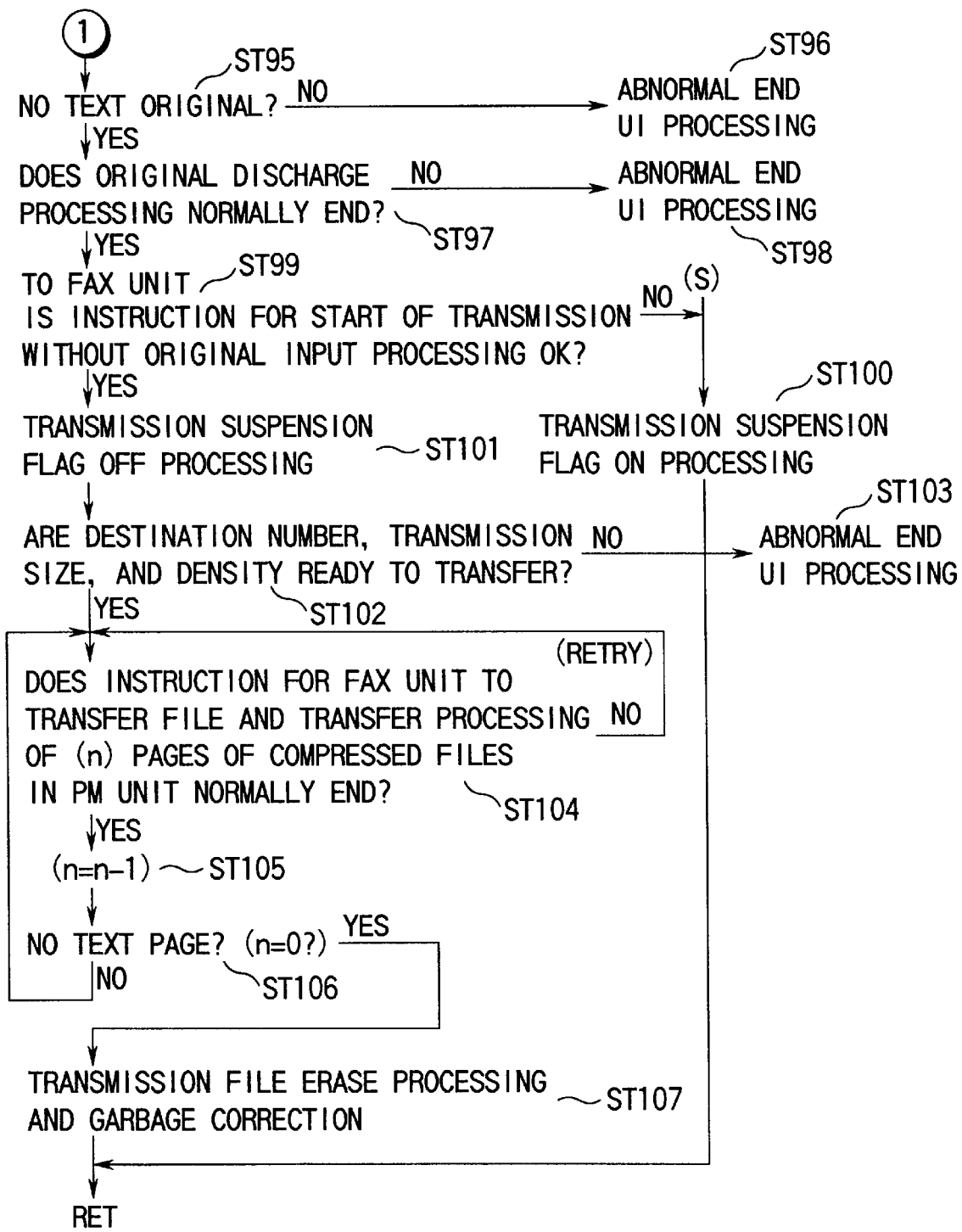
Figure 20:
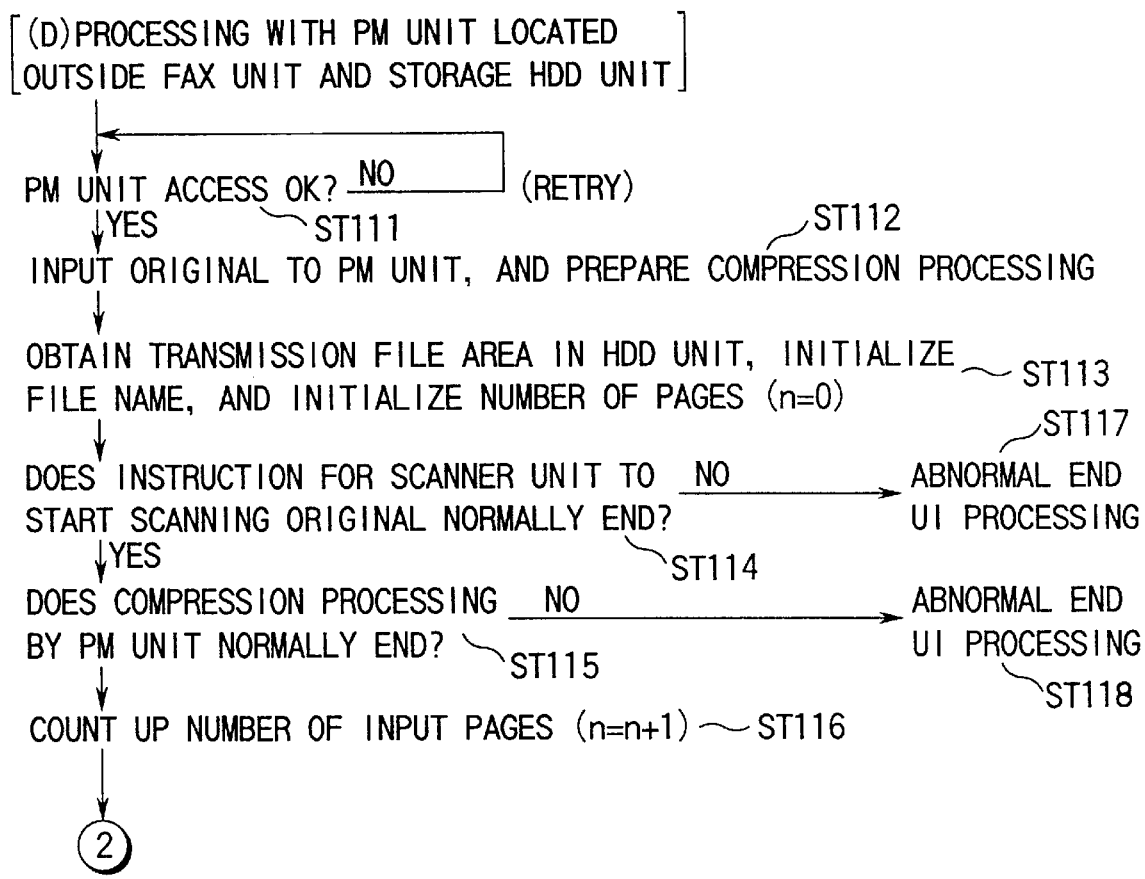
FIGS. 20 and 21 are flow charts, respectively, for explaining processing performed when the PM unit located outside the FAX unit and used for storing image data exists, and the storage HDD unit exist in transmission processing.
Figure 21:
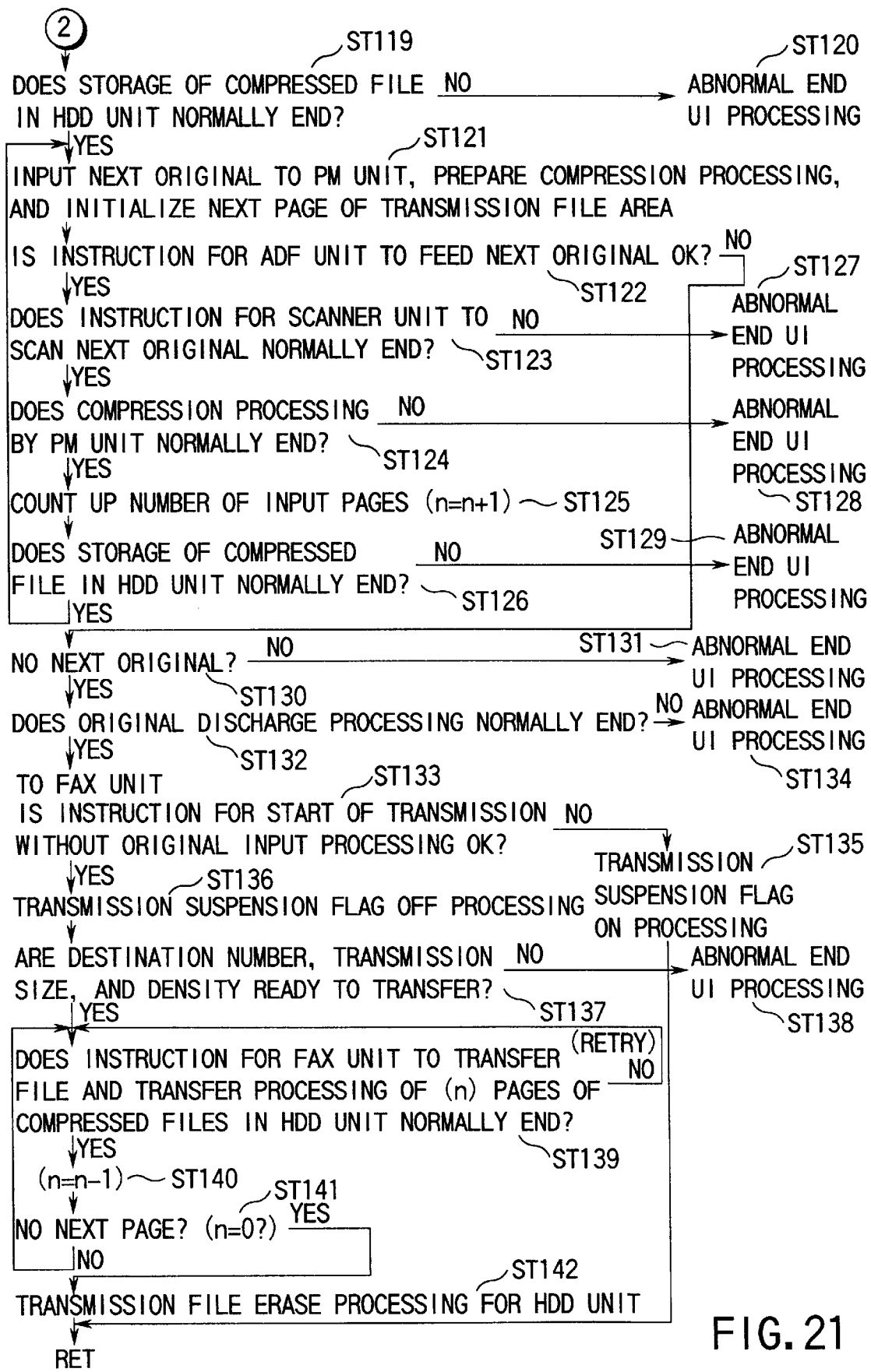
Figure 22:
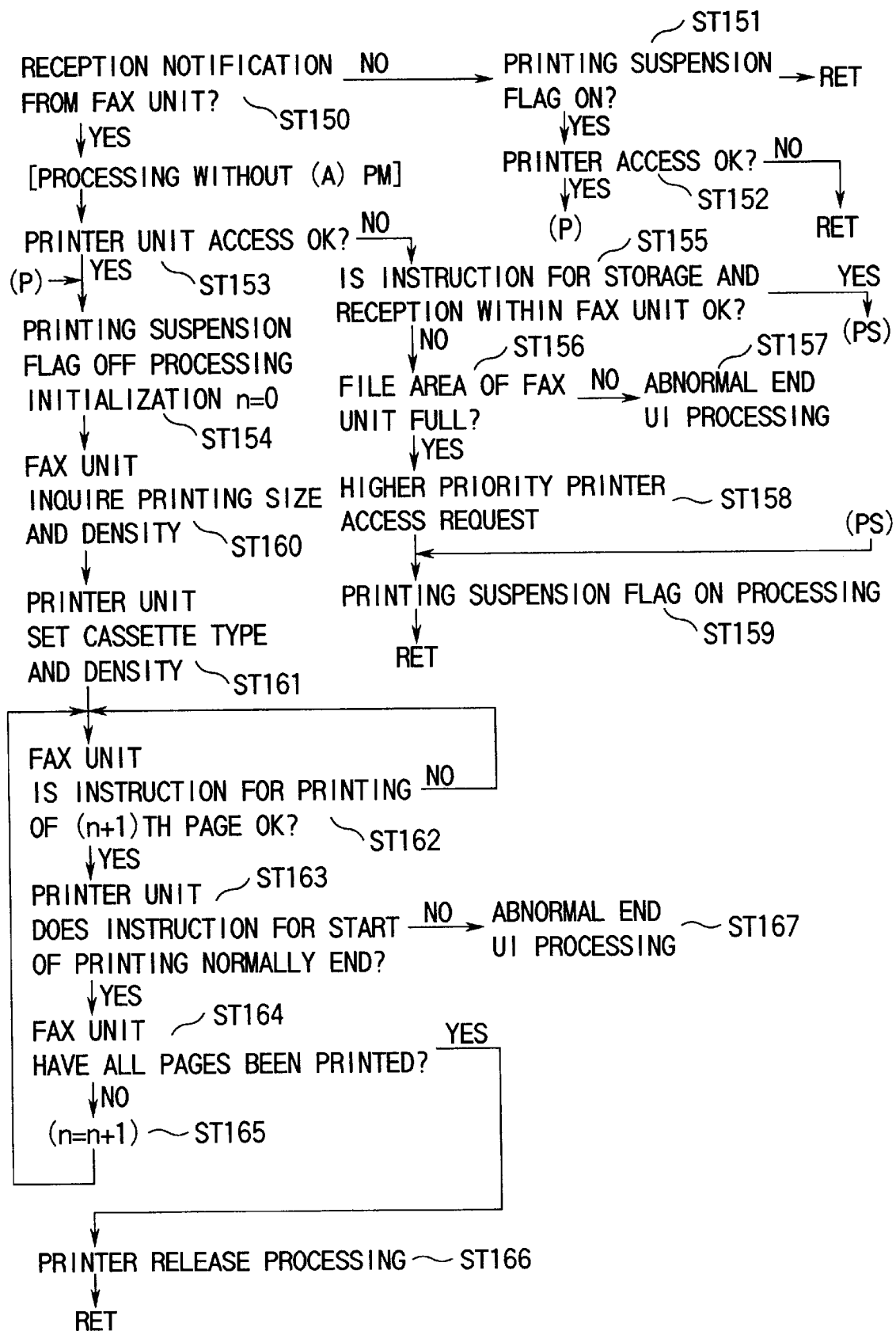
FIG. 22 is a flow chart for explaining reception processing.
Figure 23:
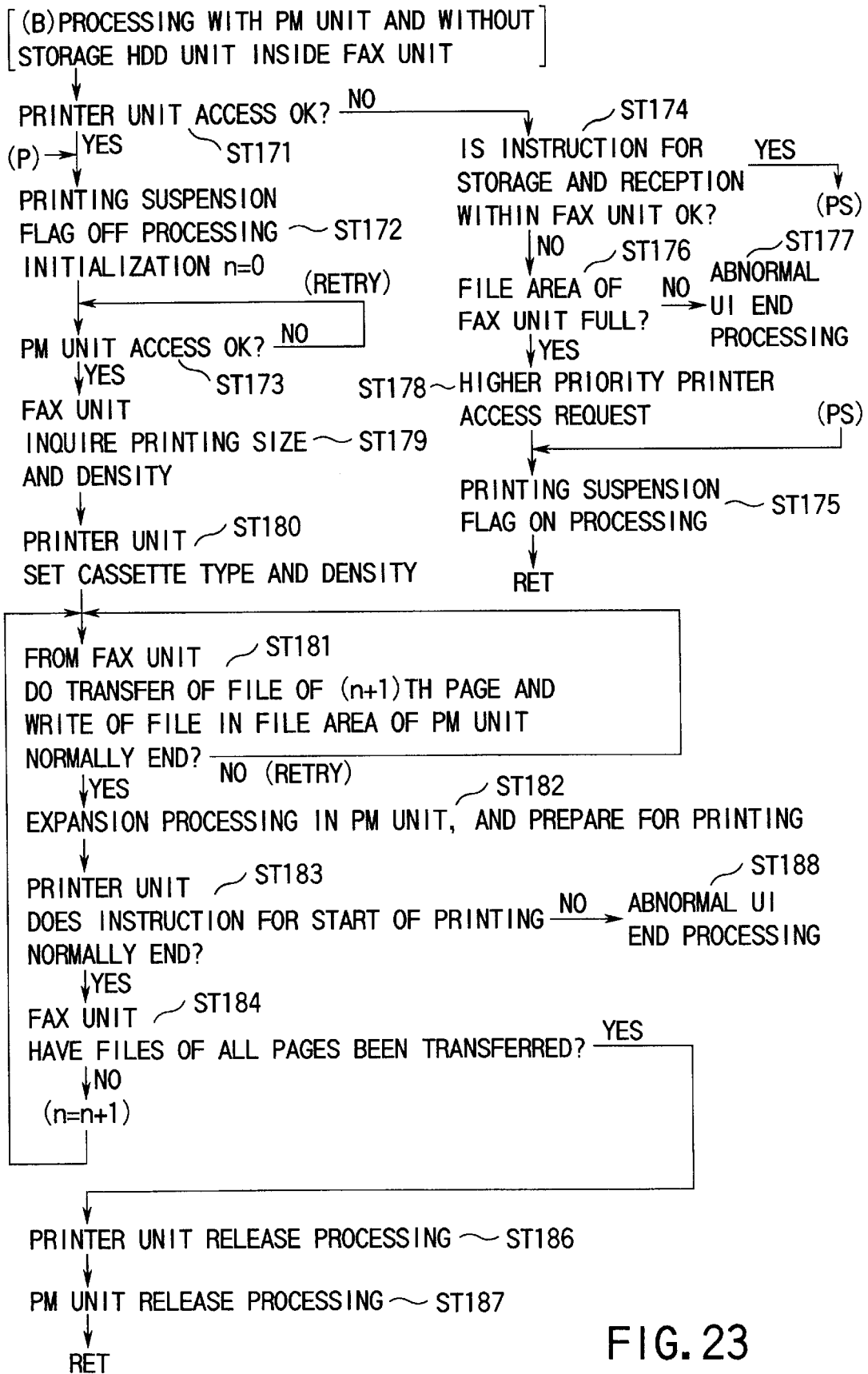
FIG. 23 is a flow chart for explaining processing performed when the PM unit exists, and neither a PM extended memory for the FAX unit nor an HDD unit exists in reception processing.
Figure 24:
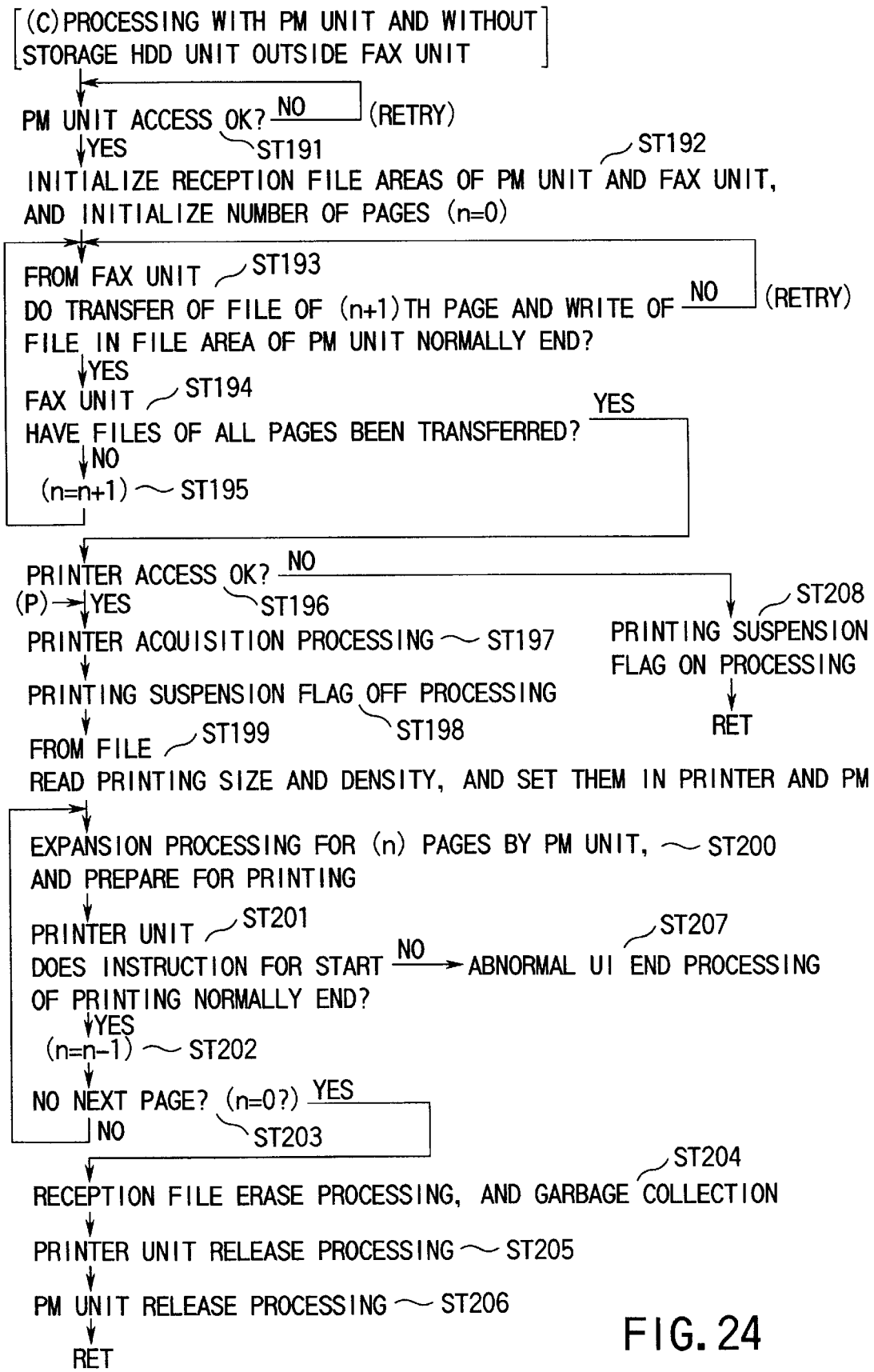
FIG. 24 is a flow chart for explaining processing performed when the PM unit located outside the FAX unit and used for storing image data exists, and no storage HDD unit exists in reception processing.
Figure 25:
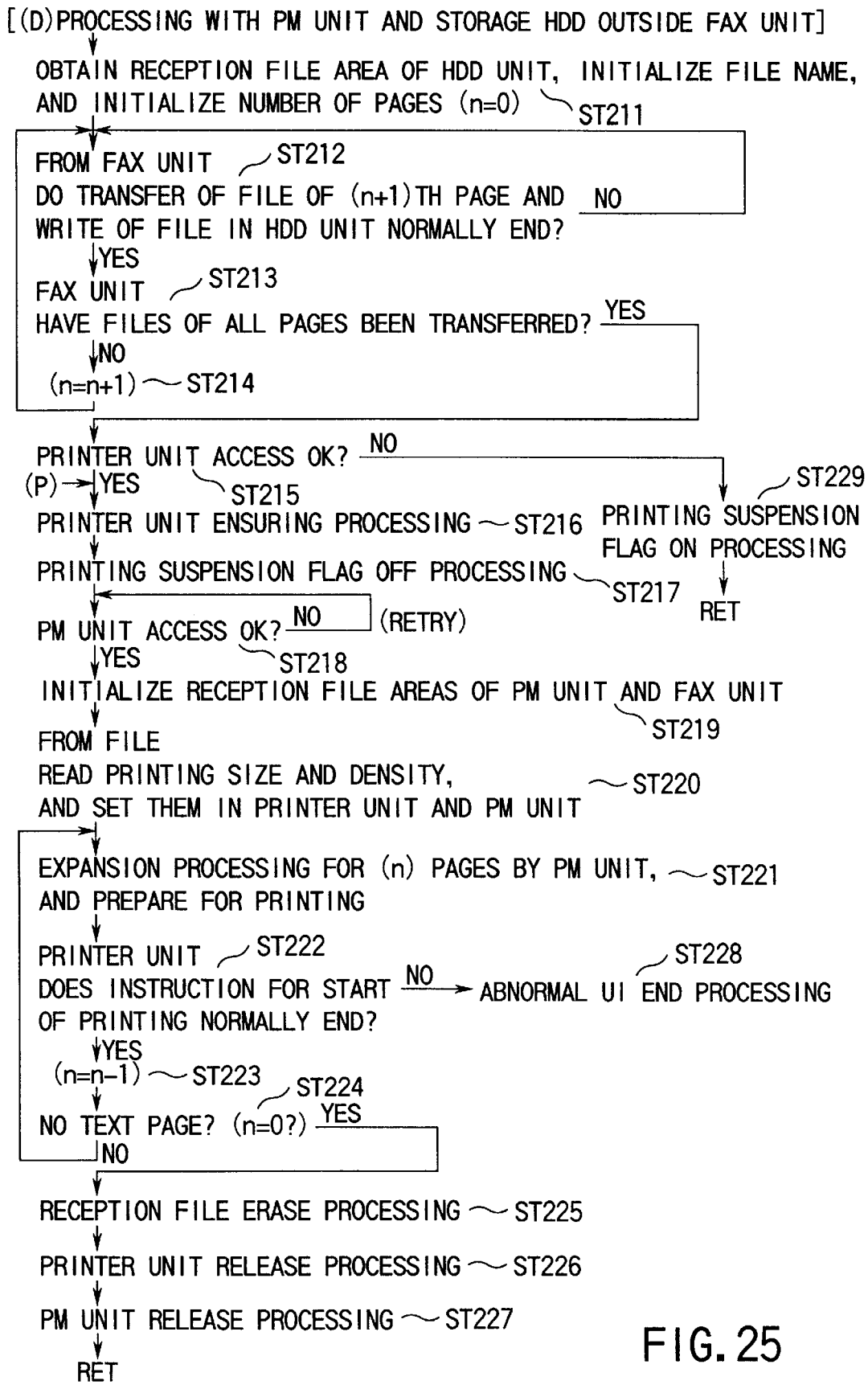
FIG. 25 is a flow chart for explaining processing performed when the PM unit located outside the FAX unit and used for storing image data exists and the storage HDD unit exist in reception processing.

As processing (C) subsequent to step 30, processing when the PM unit 103 and a PM extended memory for the FAX unit 104 exist, no HDD unit 106 exists, original input processing and file storage are performed by the PM unit 103, and only FAX transmission is performed by the FAX unit 104 will be described with reference to flow charts in FIGS. 18 and 19.

In this case, since the extended memory for storing a file exists on the PM unit 103, the image forming apparatus is controlled as a multi-functional copying machine to process input originals at once at a higher speed in order to complete FAX original input processing within a short time and quickly empty the image buffers of the ADF 7, the scanner unit 4, and the PM unit 103 for other operations. At the same time, as a supplementary function, to eliminate the principle disadvantage that the original feed order by the copying machine ADF 7 is from the last original page, pages are FAX-transmitted from the first page stacked on the ADF 7 after reading all the pages, i.e., the pages are sequentially sent to the FAX unit 104 in the order from the last read page.

In transferring a file to the FAX unit 104 after all the original pages are read at once, the files of the respective pages cannot be continuously transferred due to the influence of the line speed. Therefore, a transmission suspension flag is set until transmission of the next file starts upon transferring the file of one page, thereby generating a routine for temporarily branching from the task for the purpose of another processing.

In a suspension state, the transmission processing routine is repeatedly performed until the FAX unit 104 can transfer the next file. When the files of all the pages have been transferred, the transmitted files in the extended memory are erased for next transmission. To perform padding for the memory upon the erase, filling (garbage collection) the space with a time-designated transmission file and the like is performed, and the control branches from this routine.

More specifically, access to the PM unit 103 is requested, which is retried until the PM unit 103 replies "OK" (ST81).

If access to the PM unit 103 is granted, an original is input to the PM unit 103, compression processing is prepared for, a FAX transmission file area is initialized, and the number of pages is initialized (ST82).

The scanner unit 4 is instructed to start scanning an original. If the processing normally ends upon reception of this instruction (ST83), the PM unit 103 receives image data from the scanner unit 4.

Also at this time, the reception of data in the PM unit 103, and compression of the received data are automatically performed in response to an image transfer sync signal from the scanner unit 4. After checking whether the image compression has normally ended (ST85), the number of input pages is counted up (ST87).

If NO in step 83 or 85, the control returns to abnormal end UI processing (ST84 or ST86).

Subsequent to step 87, the next original is input to the PM unit 103, compression processing is prepared for, and the next page of the FAX transmission file area is initialized (ST88).

The ADF 7 is instructed to feed the next original. If the ADF 7 replies "OK" upon reception of this instruction (ST89), the scanner unit 4 is instructed to start scanning the next original. If the processing normally ends upon reception of this instruction (ST90), the PM unit 103 receives image data from the scanner unit 4.

Also at this time, the reception of data in the PM unit 103, and compression of the received data are automatically performed in response to an image transfer sync signal from the scanner unit 4. After checking whether the image compression has normally ended (ST92), the number of input pages is counted up (ST94).

If NO in step 90 or 92, the control returns to abnormal end UI processing (ST91 or ST93).

If no original D is present on the ADF 7, the ADF 7 does not reply "OK" (normal end) for the original feed instruction (ST89). As a result, it is determined that no original D is present (ST95).

If the ADF 7 does not reply "OK" owing to a reason other than the absence of the original D, an abnormality such as paper jam may have occurred (ST96).

If YES in ST95, whether the last read original D is normally discharged from the ADF 7 is checked (ST97). If YES in ST97, the FAX unit 104 is instructed to start transmission without any original input processing. Whether the FAX unit 104 replies "OK" is checked (ST99).

If NO in ST97, the control returns to abnormal end UI processing (ST98).

If transmission is denied in step 99, a transmission suspension flag is set (ST100), and the control temporarily branches from the transmission processing.

If YES in step 99, the transmission suspension flag is reset (ST101), and transmission condition information such as destination number information, transmission original size information, and density information is transferred.

Although no abnormality generally occurs at this time, abnormality processing can be performed (ST102 and ST103).

The FAX unit 104 is instructed to transfer a file. The FAX unit 104 transfers (n) pages of compressed files in the PM unit 103, and whether the processing has normally ended is checked (ST104).

If NO in ST102, the control returns to abnormal end UI processing (ST103).

If YES in step 104, the number of input pages is counted down (ST105) to check whether the next page exists (ST106). If NO in ST106, the control returns to step 104; if YES in ST106, transmission files are erased, and garbage collection is performed (ST107) to end the transmission processing.

In processing (D) subsequent to step 30, when the HDD unit 106 exists, the FAX unit 104 has the same role as in processing (C), and performs only transmission processing. Processing (D) is different from processing (C) in that the PM unit 103 performs only image input and file compression, and the HDD unit 106 performs file storage, instead of the PM unit 103. This will be explained with reference to flow charts in FIGS. 20 and 21.

At this time, the PM unit 103 performs reception and compression of image data, and storage of a file in the HDD unit 106 in units of pages. Thereafter, the HDD unit 106 transfers a transmission file from the last page to the FAX unit 104 in units of pages. Also at this time, the same control as in processing (C) must be executed because transmission suspension occurs. Since the HDD unit 106 has a large storage capacity, no garbage collection is performed though a file erase is performed.

More specifically, access to the PM unit 103 is requested, which is retried until the PM unit 103 replies "OK" (ST111).

If access to the PM unit 103 is granted, an original is input to the PM unit 103, and compression processing is prepared for (ST112). A transmission file area is obtained in the HDD unit 106, a file name is initialized, and the number of pages is initialized (ST113).

The scanner unit 4 is instructed to start scanning an original. If the processing normally ends upon reception of this instruction (ST114), the PM unit 103 receives image data from the scanner unit 4.

Also at this time, the reception of data in the PM unit 103, and compression of the received data are automatically performed in response to an image transfer sync signal from the scanner unit 4. After checking whether the image compression has normally ended (ST115), the number of input pages is counted up (ST116).

If NO in step 114 or 115, the control returns to abnormal end UI processing (ST116 or ST118).

Subsequent to step 116, a compressed file is stored in the HDD unit 106, and whether the processing has normally ended is checked (ST119). If it is determined by this check that the processing has not normally ended, the control returns to abnormal end UI processing (ST120).

If YES in step 116, an original is input to the PM unit 103, compression processing is prepared for, and the next page of the FAX transmission file area is initialized (ST121).

The ADF 7 is instructed to feed the next original. If the ADF 7 replies "OK" in response to this instruction (ST122), the scanner unit 4 is instructed to start scanning the next original. If the processing normally ends in response to this instruction (ST123), the PM unit 103 receives image data from the scanner unit 4.

Also at this time, the reception of data in the PM unit 103, and compression of the received data are automatically performed by an image transfer sync signal from the scanner unit 4. After checking whether the image compression has normally ended (ST124), the number of input pages is counted up (ST125). A compressed file is stored in the HDD unit 106, and whether the processing has normally ended is checked (ST126). If YES in ST126 from this check, the control returns to step 121.

If NO in step 123, 124, or 126, the control returns to abnormal end UI processing (ST127, ST128, or ST129).

If no original D is present on the ADF 7, the ADF 7 does not reply "OK" (normal end) for the original feed instruction (ST122). As a result, it is determined that no original D is present (ST130).

If the ADF 7 does not reply "OK" owing to a reason other than the absence of the original D, an abnormality such as paper jam may have occurred (ST131).

If YES in ST130, whether the last read original D is normally discharged from the ADF 7 is checked (ST132). If YES in ST132, the FAX unit 104 is instructed to start transmission without any original input processing. Whether the FAX unit 104 replies "OK" is checked (ST133).

If NO in ST132, the control returns to abnormal end UI processing (ST134).

If transmission is denied in step 133, a transmission suspension flag is set (ST135), and the control temporarily branches from the transmission processing.

If YES in step 133, the transmission suspension flag is reset (ST136), and transmission condition information such as destination number information, transmission original size information, and density information is transferred.

Although no abnormality generally occurs at this time, abnormality processing can be performed (ST137 and ST138).

The FAX unit 104 is instructed to transfer a file. The FAX unit 104 transfers (n) pages of compressed files in the PM unit 103, and whether the processing has normally ended is checked (ST139).

If NO in ST139, this step is retried.

If YES in step 139, the number of input pages is counted down (ST140), and whether the next page exists is checked (ST141). If NO in ST141, the control returns to step 139; if YES in ST141, erase processing is performed for the HDD unit 106 (ST142) to end the transmission processing.

Reception processing will be described with reference to flow charts in FIGS. 22 to 25.

More specifically, when the control first enters a reception processing flow upon reception of a reception notification from the FAX unit 104 (ST150), it executes the following flow which changes depending on the system configuration.

If the control enters the reception processing flow from step 150 while no printer access is granted, and printing is suspended (ST151 and ST152), processing when printing is suspended is executed. For example, the control advances to step 216 (to be described later).

In reception processing without any PM unit 103, as processing (A) subsequent to step 150, whether printing has been prepared for is inquired of the FAX unit 104. If printing has been prepared for, the FAX unit 104 directly outputs printing data to the printer unit 6, and controls it to sequentially print the data until all printing pages are printed. If access to the printer unit 6 is requested and cannot be acquired, the FAX unit 104 is instructed to store a reception file in a file memory (code buffer RAM unit 146) within the FAX unit 104. Immediately after access to the printer unit 6 is acquired, the data is printed. When the file memory within the FAX unit 104 becomes almost full, a printer access request having higher priority, i.e., a strong request requesting access to the printer unit 6 even if another processing is stopped is output to print the reception file. This will be explained with reference to a flow chart in FIG. 23.

In an actual flow, access to the printer is requested. If access is granted (ST153), the printing suspension flag is reset because access to the printer unit 6 is acquired. The number of printing pages is initialized (ST154) to print.

If NO in step 153, the FAX unit 104 is instructed to store the reception file in the internal file memory. If the FAX unit 104 replies "OK" upon reception of this instruction (ST155), the printing suspension flag is set, and the control temporarily branches from the reception processing (ST159).

If NO in step 155, whether the file area of the FAX unit 104 is full is checked. If the file area is not full (ST156), the control returns to abnormal end UI processing (ST157).

If it is determined in step 156 that the internal file memory is full, and the reception file becomes difficult to internally store, a request having high priority is output to another processing (ST158). The printing suspension flag is set, and the control temporarily branches from the reception processing (ST159).

In printing processing, the printing size, the printing density, and the like are inquired of the FAX unit 104 (ST160). In accordance with them, the cassette type, the printing density, and the like are set in the printer unit 6 (ST161). The FAX unit 104 is instructed to sequentially print data from the first page (ST162). When printing has been prepared for, the printer unit 6 is activated every page to actually print the data (ST163). This operation is continuously performed until all of reception pages are printed (ST164 and ST165). Upon completion of printing (ST164), the printer unit 6 is released (ST166), and the control branches from the reception processing routine.

If it is determined in step 163 that the processing has not normally ended, the control returns to abnormal end UI processing (ST167).

As processing (B) subsequent to step 153, when the PM unit 103 exists and has neither a FAX extended memory for storing a reception file nor the HDD unit 106, only printing processing is performed via the PM unit 103, and FAX reception and file storage are performed by the FAX unit 104.

In the above-described routine (A), a printing instruction is directly output to the FAX unit 104. Instead of this, reception files are transferred to the PM unit 103 one by one, expanded and mapped by the PM unit 103, and printed by the printer unit 6. Since the PM unit 103 is also commonly used for another processing such as a PPC function, similar to the printer unit 6, acquisition and release processes must be performed. This will be explained with reference to the flow chart in FIG. 23.

Access to the printer unit 6 is requested. If access is granted (ST171), the printing suspension flag is reset because access to the printer unit 6 is acquired. The number of printing pages is initialized (ST172). Access to the PM unit 103 is requested, which is retried until the PM unit 103 replies "OK" (ST173). Subsequent printing processing is performed.

If NO in step 171, the FAX unit 104 is instructed to store a reception file in the internal file memory. If the FAX unit 104 replies "OK" upon reception of this instruction (ST174), the printing suspension flag is set, and the control temporarily branches from the reception processing (ST175).

If NO in step 174, whether the file area of the FAX unit 104 is full is checked. If the file area is not full (ST176), the control returns to abnormal end UI processing (ST177).

If it is determined in step 176 that the internal file memory is full, and the reception file becomes difficult to internally store, a request having high priority is output to another processing (ST178). The printing suspension flag is set, and the control temporarily branches from the reception processing (ST175).

In printing processing, the printing size, the printing density, and the like are inquired of the FAX unit 104 (ST179). In accordance with them, the cassette type, the printing density, and the like are set in the printer unit 6 (ST180).

The file of the (n–1)th page is transferred from the FAX unit 104, and written in the file area of the PM unit 103. Whether the processing has normally ended is checked (ST181).

If NO in ST181, this processing is retried.

If YES in ST181, expansion processing is performed in the PM unit 103 to prepare for printing (ST182).

The printer unit 6 is instructed to start printing, and whether the processing normally ends is checked (ST183).

If YES in ST183, whether the FAX unit 104 has transferred the files of all pages is checked (ST184). If NO in ST184, the number of transferred files is counted up (ST185), and the control returns to step 181.

If YES in ST184, the printer unit 6 is released (ST186), the PM unit 103 is released (ST187), and the control branches from the reception processing routine.

If NO in step 183, the control returns to abnormal end UI processing (ST188).

As processing (C) subsequent to step 150, when the PM unit 103 exists and has a FAX extended memory for storing a reception file but no HDD unit 106, storage of a reception file and printing processing are performed by the PM unit 103, and only FAX reception is performed by the FAX unit 104.

In this case, all the pages of reception files received by the FAX unit 104 are temporarily stored in the FAX expanded file memory within the PM unit 103, and printed from the last one of the received pages. Accordingly, the pages can be sequentially sorted from the first page to the last one upon printing all the pages. When all the pages are printed in the PM unit 103, a simultaneous erase is performed for one communication/reception in which the reception files are printed, and processing (garbage collection) of shifting the subsequently stored files is performed. By performing this processing, a larger file storage capacity can be ensured. This will be explained with reference to a flow chart in FIG. 24.

Access to the PM unit 103 is checked, which is retried until the PM unit 103 replies "OK" (ST191).

If YES in ST191, the reception file areas of the PM unit 103 and the FAX unit 104 are initialized, and the number of pages is initialized (ST192).

The file of the (n+1)th page is transferred from the FAX unit 104, and written in the file area of the PM unit 103. Whether the processing has normally ended is checked (ST193).

If NO in ST193, this processing is retried.

If YES in ST193, whether the FAX unit 104 has transferred the files of all pages is checked (ST194). If NO in ST194, the number of transferred files is counted up (ST195), and the control returns to step 193.

If YES in ST194, access to the printer unit 6 is requested. If access is granted (ST196), acquisition processing for the printer unit 6 is performed (ST197), and the printing suspension flag is reset (ST198). Depending on the file, the printing size, the density, the read, the printer unit 6, and the PM unit 103 are set (ST199).

Expansion processing is performed for n pages by the PM unit 103 to prepare printing (ST200).

The printer unit 6 is instructed to start printing, and whether the processing normally ends is checked (ST201). If YES in ST201, the number of printing pages is counted down (ST202), and whether the next page exists is checked (ST203). If YES in ST203, the control returns to step 200; if NO in ST203, reception file erase processing is performed, and garbage collection is performed (ST204). The printer unit 6 is released (ST205), and the PM unit 103 is released (ST206) to end the transmission processing.

If NO in step 201, the control returns to abnormal end UI processing (ST207).

If NO in step 196, the printing suspension flag is set, and the control temporarily branches from the reception processing (ST208).

As processing (D) subsequent to step 150, in a system with the HDD unit 106 for storing a file, a reception file stored in the file storage extended memory within the PM unit 103 in routine (C) is stored in the HDD unit 106, and all the pages of reception files are similarly printed from the last page. Since the HDD unit 106 has a larger storage capacity, no garbage collection is performed. This will be explained with reference to a flow chart in FIG. 25.

The reception file area of the HDD unit 106 is obtained, the file name is initialized, and the number of pages is initialized (ST211).

The FAX unit 104 transfers the file of the (n+1)th page, and writes it in the file area of the HDD unit 106. Whether the processing has normally ended is checked (ST212).

If NO in step 212, this processing is retried.

If YES in step 212, whether the FAX unit 104 has transferred the files of all pages is checked (ST213). If NO in ST213, the number of transferred files is counted up (ST214), and the control returns to step 212.

If YES in ST213, access to the printer unit 6 is requested. If the use is permitted (ST215), acquiring processing for the printer unit 6 is performed (ST216), and the printing suspension flag is set (ST217). Access to the PM unit 103 is checked, which is retried until the PM unit 103 replies "OK" (ST218).

If YES in ST218, the reception file areas of the PM unit 103 and the FAX unit 104 are initialized (ST219).

Depending on the file, the printing size, the density, the read, the printer unit 6, and the PM unit 103 are set (ST220).

Expansion processing is performed for n pages by the PM unit 103 to prepare for printing (ST221).

The printer unit 6 is instructed to start printing, and whether the processing has normally ended is checked (ST222). If YES in ST222, the number of printing pages is counted down (ST223), and whether the next page exists is checked (ST224). If YES in ST224, the control returns to step 221; if NO in ST224, reception file erase processing is performed (ST225). The printer unit 6 is released (ST226), and the PM unit 103 is released (ST227) to end the transmission processing.

If NO in step 222, the control returns to abnormal end UI processing (ST228).

If NO in step 215, the printing suspension flag is set, and the control temporarily branches from the reception processing (ST229).

Processing when the functions of the respective system configurations are compared by exemplifying the FAX system will be described with reference to FIG. 26.

At option level A, since the FAX system has only the FAX unit 104, all operations associated with the FAX must be performed by the FAX unit 104 alone.

At option level B, since the expanded memory 104a of the FAX unit 104 is additionally arranged, the FAX system is compatible with high-resolution input/output and transmission/reception.

At option level C, since the FAX system also has the PM unit 103, compression/expansion can be performed at a high speed by inputting/outputting an image via the PM unit 103. Therefore, image input/output can be performed at a high speed. By using the editing function of the PM unit 103, an editing/transmission/reception function can be realized. The image input/output order of the copying machine can be changed for FAX transmission and reception.

At option level D, since the expanded memory 103a of the PM unit 103 is additionally arranged, a file can be stored in the PM unit 103. Accordingly, the FAX system is compatible with a high resolution without any expanded memory 104a of the FAX unit 104.

At option level E, the FAX system also has the HDD unit 106. By using a large storage capacity, a confidential transmission/reception function as transmission/reception for a designated end system, and a function such as time-designated transmission/reception in which data is transmitted/received at time when the line use charge is low can be realized in addition to large-capacity transmission/reception.

Figure 15:
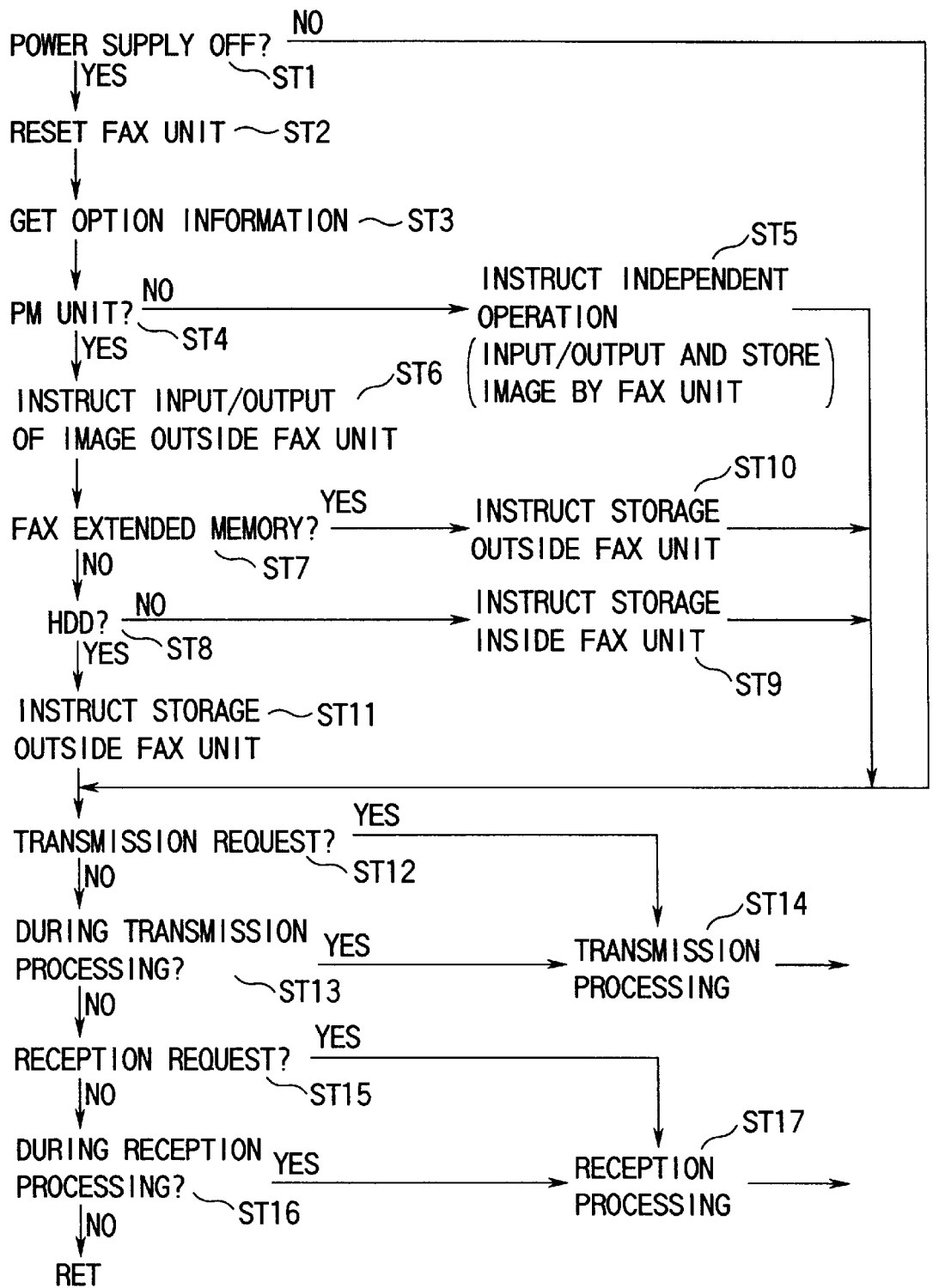
FIG. 15 is a flow chart for explaining FAX task processing.

Processing that generally changes when the contents explained with reference to the flow chart of the FAX task processing shown in FIG. 15 are applied to not only the FAX unit 104 but also another option will be described with reference to FIG. 27.

In this case, whether the PM unit 103 is arranged, the HDD unit 106 is arranged, the expanded memory 103a is arranged in the PM unit 103, the PM unit 103 is used, and the file capacity of the expanded memory 103a of the PM unit 103 is used and full are checked on the respective stages to determine operation control.

The number of resource channels used and the processing time in each processing of the PM unit 103 will be described with reference to FIG. 28. Assuming the copying processing time serving as a main function to be 1, FAX processing requires ¼ for normal resolution and ½ for high resolution. The maximum processing time of editing without any printing is ¼ at most. For this reason, when the PM unit 103 is arranged as an option, it can perform processing at a much higher speed.

As has been described above, by optimizing the control depending on the configuration of each user, the system can be operated at the highest efficiency for each configuration.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalent.

What is claimed is:

1. An image forming apparatus having read means for reading an image, and image forming means for forming an image of image data read by said read means on an image formation medium, comprising:

a first processing board which is mounted on said image forming apparatus, has a first page memory, and has a first function of forming an image of image data from a first external device on said image formation medium by using said image forming means, and outputting the image data read by said read means to said first external device;

a second processing board which is mounted on said image forming apparatus, has a second page memory, and has a second function of forming the image of the image data from a second external device on said image formation medium by using said image forming means; and a third processing board which is mounted on said image forming apparatus, and has a third function of storing the image data read by said read means, storing image data in executing the first function, and storing image data in executing the second function, wherein, when at least said third processing board and said first or second processing board are mounted on said image forming apparatus, the first or second function of said first or second processing board is executed using the third function of said third processing board without using said first or second page memory of said first or second processing board, and in executing the first or second function, whether the first or second function is used by another function is determined, degrees of urgency are compared, when the first or second function is determined to have high urgency, the first or second function in use having low urgency is temporarily interrupted, after the first or second function having high urgency is performed, operation of the first or second function having low urgency is continued again.

2. An apparatus according to claim 1, wherein the determination of whether the first or second function is used by another function in executing the first or second function is performed in an interruptible step, and when the first or second function has high urgency, the first or second functions are switched at a corresponding timing.

3. An image forming apparatus having read means for reading an image, and image forming means for forming an image of image data read by said read means on an image formation medium, comprising:

a first processing board which is mounted on said image forming apparatus, has a first page memory, and has a first function of forming an image of image data from a first external device on said image formation medium by using said image forming means, and outputting the image data read by said read means to said first external device;

a second processing board which is mounted on said image forming apparatus, has a second page memory, and has a second function of forming the image of the image data from a second external device on said image formation medium by using said image forming means;

a third processing board which is mounted on said image forming apparatus, and has a third function of storing the image data read by said read means, storing image data in executing the first function, and storing image data in executing the second function; and a fourth processing board which is mounted on said image forming apparatus, has a storage capacity larger than a storage capacity of said third processing board, and has a fourth function of storing the image data read by said read means, wherein, when at least one of said processing boards is mounted on said image forming apparatus, a flow of the image data is switched to be optimized.

4. An apparatus according to claim 3, wherein, at least said first, third, and fourth processing boards are mounted on said image forming apparatus, processing associated with said first processing board is performed regardless of whether said third processing board is used.

* * * * *